(12) United States Patent
Chae et al.

(10) Patent No.: US 12,164,083 B2
(45) Date of Patent: Dec. 10, 2024

(54) OPTICAL IMAGING SYSTEM

(71) Applicant: SAMSUNG ELECTRO-MECHANICS CO., LTD., Suwon-si (KR)

(72) Inventors: Kyu Min Chae, Suwon-si (KR); Eun Chong Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 645 days.

(21) Appl. No.: 17/378,945

(22) Filed: Jul. 19, 2021

(65) Prior Publication Data
US 2022/0317420 A1   Oct. 6, 2022

(30) Foreign Application Priority Data
Mar. 26, 2021   (KR) .......................... 10-2021-0039790

(51) Int. Cl.
*G02B 13/00* (2006.01)
*G02B 9/64* (2006.01)
(Continued)

(52) U.S. Cl.
CPC ........... *G02B 13/0045* (2013.01); *G02B 9/64* (2013.01); *G02B 27/0025* (2013.01); *H04N 23/55* (2023.01)

(58) Field of Classification Search
CPC .... G02B 13/0045; G02B 13/00; G02B 13/18; G02B 9/64; G02B 27/0025; G02B 1/041;
(Continued)

(56) References Cited

U.S. PATENT DOCUMENTS 4,557,567 A * 12/1985 Azumi ........... G02B 15/145125
359/683
9,383,553 B2   7/2016 Shinohara et al.
(Continued)

FOREIGN PATENT DOCUMENTS

CN     107065138 A   8/2017
CN     109541780 A   3/2019
(Continued)

OTHER PUBLICATIONS

Taiwanese Office Action issued on Jul. 4, 2023, in counterpart Taiwanese Patent Application No. 111138834 (5 pages in English, 4 pages in Chinese).
(Continued)

*Primary Examiner* — George G. King
*Assistant Examiner* — Anna Smith
(74) *Attorney, Agent, or Firm* — NSIP Law

(57) ABSTRACT

An optical imaging system includes a first lens, a second lens, a third lens, a fourth lens, a fifth lens, a sixth lens and a seventh lens sequentially disposed from an object side. The optical imaging system satisfies $|Pnu|[10^{-6 \circ} C.^{-1} mm^{-1}] \leq 30$, where Pnu is $\Sigma Pnui$ in which $i=1, 2, \ldots, 7$, Pnui is $1/(vti \cdot fi)$, vti is $[DTni/(ni-1)-CTEi]^{-1}$, fi is an effective focal length of an i-th lens, ni is a refractive index of the i-th lens, DTni is a rate (dni/dT) of change of the refractive index according to a temperature of the i-th lens, and CTEi is a thermal expansion coefficient of the i-th lens.

13 Claims, 22 Drawing Sheets

(51) Int. Cl.
*G02B 27/00* (2006.01)
*H04N 23/55* (2023.01)

(58) Field of Classification Search
CPC .................. G02B 3/0087; G02B 9/02; G02B 2003/0093; H04N 23/55; G03B 30/00
See application file for complete search history.

(56) References Cited

U.S. PATENT DOCUMENTS

| | | | |
|---|---|---|---|
| 2005/0018314 A1* | 1/2005 | Yamaguchi | G02B 13/0035 359/676 |
| 2009/0296235 A1* | 12/2009 | Igarashi | G02B 23/243 359/720 |
| 2011/0286105 A1 | 11/2011 | Yamanaka et al. | |
| 2015/0168692 A1 | 6/2015 | Kitahara | |
| 2018/0056869 A1 | 3/2018 | Nagano | |
| 2019/0271831 A1 | 9/2019 | Hsu et al. | |
| 2020/0166733 A1* | 5/2020 | Xie | G02B 13/006 |
| 2020/0257079 A1 | 8/2020 | Wei et al. | |
| 2021/0003820 A1* | 1/2021 | Zhang | G02B 13/16 |
| 2021/0072509 A1 | 3/2021 | Chae et al. | |
| 2021/0382280 A1 | 12/2021 | Hosono et al. | |
| 2022/0386857 A1* | 12/2022 | Igarashi | A61B 1/00188 |

FOREIGN PATENT DOCUMENTS

| | | |
|---|---|---|
| CN | 110456475 A | 11/2019 |
| CN | 211627919 U | 10/2020 |
| CN | 112269252 A | 1/2021 |
| JP | 2011-247962 A | 12/2011 |
| JP | 2018-109667 A | 7/2018 |
| JP | 2019-179155 A | 10/2019 |
| KR | 10-2021-0030007 A | 3/2021 |
| TW | I657258 B | 4/2019 |
| WO | WO 2020/090368 A1 | 5/2020 |

OTHER PUBLICATIONS

Chinese Office Action issued on Nov. 23, 2022, in counterpart Chinese Patent Application No. 202111213945.8 (6 pages in English, 7 pages in Chinese).

Chinese Office Action issued on Nov. 25, 2022, in counterpart Chinese Patent Application No. 202210423465.2 (6 pages in English, 8 pages in Chinese).

Korean Office Action issued on May 10, 2023, in counterpart Korean Patent Application No. 10-2021-0039790 (6 pages in English, 5 pages in Korean).

* cited by examiner

OPTICAL IMAGING SYSTEM

CROSS-REFERENCE TO RELATED APPLICATION

This application claims the benefit under 35 USC 119(a) of Korean Patent Application No. 10-2021-0039790 filed on Mar. 26, 2021 in the Korean Intellectual Property Office, the entire disclosure of which is incorporated herein by reference for all purposes.

BACKGROUND

1. Field

The following description relates to an optical imaging system, and more particularly, to an optical imaging system applied to a camera mounted on a vehicle.

2. Description of Background

As the number of vehicles equipped with image processing functions such as lane keeping or autonomous driving increases, demand for monitoring and sensing cameras that may support such functions is also increasing. Along with the increase in the number of cameras required, the demand for cameras that may provide higher resolution for accurate image processing is also increasing, so the need to develop high-definition precision lenses suitable for mass production is emerging.

In the case of a camera lens mounted on a vehicle, a lens formed of glass is mainly used because resolution should be maintained even in a considerable temperature range. Glass lenses are relatively expensive, and thus, are disadvantageous in terms of mass production and economy. The use of plastic lenses is advantageous for mass production, and the cost of lenses may be effectively reduced.

However, compared to glass, since plastic has a characteristic that the refractive index or volume change according to temperature change is relatively large, it is difficult to provide an appropriate level of resolution in various environments. For example, plastic has a refractive index change of about 100 times higher and a coefficient of thermal expansion of about 10 times higher than those of glass, according to temperature change, and thus, the amount of defocusing caused by temperature change is large and it is difficult to keep focus in a relatively wide temperature range.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Examples provide an optical imaging system having high quality resolution even in a relatively wide temperature range. Specifically, examples provide an optical imaging system in which a BFL change is significantly low, even in a wide temperature range and thus a focal length may be maintained at a predetermined level.

In one general aspect, an optical imaging system includes a first lens, a second lens, a third lens, a fourth lens, a fifth lens, a sixth lens, and a seventh lens sequentially disposed from an object side. The optical imaging system satisfies $|Pnu|\leq30$, where Pnu is $\Sigma Pnui$ in which $i=1, 2, \ldots, 7$, Pnui is $1/(vti \cdot fi)$, vti is $[DTni/(ni-1)-CTEi]^{-1}$, fi is an effective focal length of an i-th lens, ni is a refractive index of the i-th lens, DTni is a rate (dni/dT) of change of the refractive index according to a temperature of the i-th lens, and CTEi is a thermal expansion coefficient of the i-th lens.

The optical imaging system may satisfy $0.4\leq f/f3$, where f is an effective focal length of the optical imaging system, and f3 is an effective focal length of the third lens.

The optical imaging system may include an aperture stop disposed between the second lens and the third lens.

The optical imaging system may satisfy $|Pnu3/Pnu|<0.2$.

The third lens may be comprised of glass, and the second lens, the fourth lens, the fifth lens, the sixth lens, and the seventh lens may be comprised of plastic.

The optical imaging system may satisfy $-2.0<\Sigma1/(DTni \cdot fi)$ $[10^{4\circ}$ C. $mm^{-1}]<20.0$, where $i=1, 2, \ldots, 7$.

The optical imaging system may satisfy $0.2<DTnF/DTnR<0.6$, where DTnF is a sum of DTn values of the first lens and the second lens, in which $\Sigma DTni$ (i=1, 2), and DTnR is a sum of DTn values of the third to seventh lenses, in which $\Sigma DTni$ (i=3, 4, \ldots, 7).

The optical imaging system may satisfy $-620<DTnT$ $[10^{-6\circ}$ C.$^{-1}]<-450$, where DTnT is a sum of DTn values of the first to seventh lenses, in which $\Sigma DTni$ (i=1, 2, \ldots, 7).

The optical imaging system may satisfy $-220<DTnF$ $[10^{-6\circ}$ C.$^{-1}]<-100$, where DTnF is a sum of DTn values of the first lens and the second lens, in which $\Sigma DTni$ (i=1, 2).

The optical imaging system may satisfy $-400<DTnR$ $[10^{-6\circ}$ C.$^{-1}]<-300$, where DTnR is a sum of DTn values of the third to seventh lenses, in which $\Sigma DTni$ (i=3, 4, \ldots, 7).

An object-side surface of the seventh lens may be convex and an image-side surface of the seventh lens may be concave.

The first lens may have a negative refractive power, the third lens may have a positive refractive power, the fourth lens may have a positive refractive power, the fifth lens may have a negative refractive power, and the sixth lens may have a positive refractive power.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
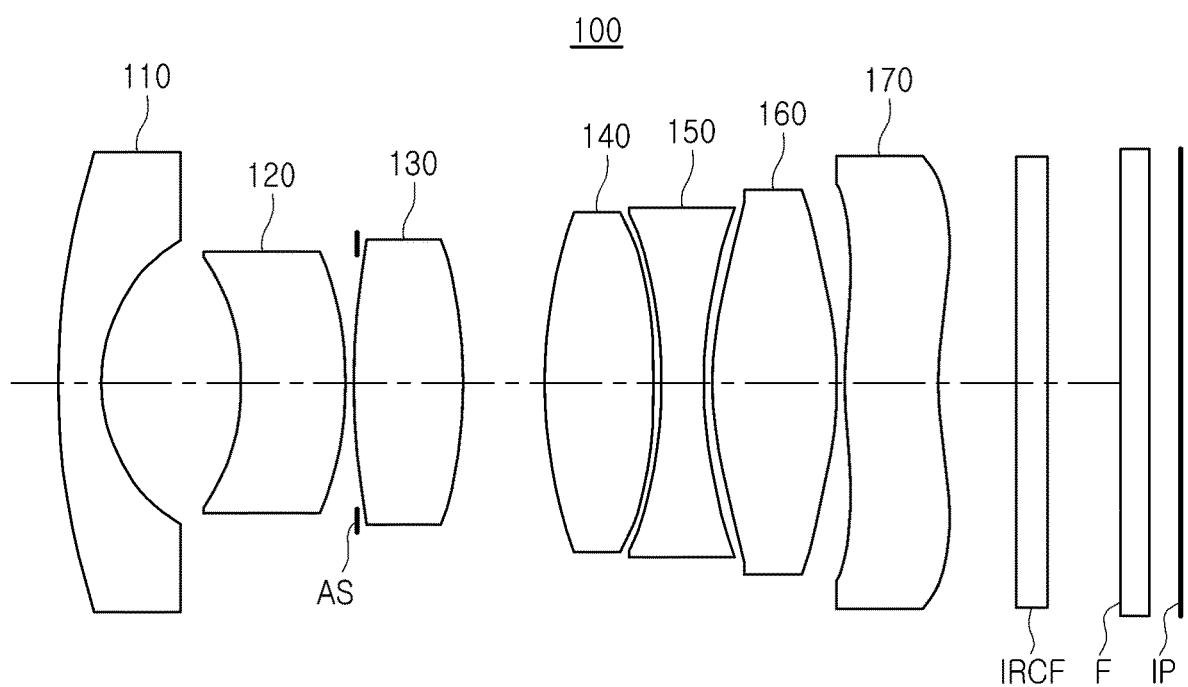
FIG. 1 is a diagram illustrating an optical imaging system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depictions of elements in the drawings may be exaggerated for clarity, illustration, and convenience.

In the following lens configuration diagram, the thickness, size, and shapes of the lenses may be somewhat exaggerated for explanation, and in particular, the shape of the spherical or aspherical surface suggested in the lens configuration diagram is presented as an example, but is not limited thereto.

In the present disclosure, a first lens refers to the lens closest to the object, and the last lens refers to the lens closest to an image sensor IS (or an image plane).

In addition, in each lens, the first surface refers to a surface close to the object (or an object-side surface), and the second surface refers to a surface close to the image plane (or an image-side surface). In addition, in this specification, the numerical values for the radius of curvature, thickness, distance, and focal length of the lens are all in mm, and the unit of field of view (FOV) is in degrees.

In addition, in the descriptions of the shape of respective lenses, unless otherwise stated, the meaning of the convex shape on one surface means that the paraxial region portion of the surface is convex, and the meaning of the concave shape on one surface means that the paraxial region portion of the surface is concave. That one surface is flat means that the paraxial region portion of the surface is flat. The paraxial region refers to a very narrow area near the optical axis.

Therefore, even when it is described that one surface of the lens is convex, the edge portion of the lens may be concave. Similarly, even when one surface of the lens is described as having a concave shape, the edge portion of the lens may be convex. Further, even when one surface of the lens is described as being flat, the edge portion of the lens may be convex or concave.

An optical imaging system according to an example includes at least 7 lenses.

For example, the optical imaging system according to an example includes a first lens, a second lens, a third lens, a fourth lens, a fifth lens, a sixth lens, and a seventh lens disposed in order from the object side. In an example, the first to seventh lenses are spaced apart from each other by a predetermined distance along the optical axis. In another example, neighboring lenses among the first to seventh lenses may be provided in a bonded state.

The optical imaging system according to an example may further include an image sensor IS for converting an incident image of a subject into an electric signal. In addition, the optical imaging system may further include an infrared cut-off filter (IRCF, hereinafter referred to as 'filter') for blocking infrared rays. The filter IRCF is disposed between the last lens and the image sensor IS.

The optical imaging system may further include an imaging plane (IP). The image plane IP refers to a plane on which light refracted by the first to seventh lenses is imaged. For example, the image plane IP may indicate a surface on which optical elements (e.g., photodiodes) are disposed in the image sensor IS.

In an example, the optical imaging system may further include an aperture stop AS for adjusting the amount of incident light. The aperture stop AS may be disposed between lenses constituting an optical system. In an example, the aperture stop AS may be disposed on an object side of a lens having a highest refractive index among lenses constituting the optical imaging system. For example, the aperture stop AS may be disposed between the second lens and the third lens.

Lenses constituting the optical imaging system according to an example may have an aspherical surface. For example, the object-side and image-side surfaces of the second lens and the fourth to seventh lenses may have aspherical surfaces. In another example, the object-side and image-side surfaces of the first lens, the second lens, and the fourth to seventh lenses may have aspherical surfaces. The aspherical surface of the lens is expressed by Equation 1.

$$Z = \frac{cY^2}{1+\sqrt{1-(1+K)c^2Y^2}} + AY^4 + BY^6 + CY^8 + DY^{10} \ldots \quad \text{Equation 1}$$

In Equation 1, c is the curvature of the lens (the reciprocal of the radius of curvature), K is the conic constant, and Y is the distance from an arbitrary point on the aspherical surface of the lens to the optical axis. In addition, constants A to D refer to aspheric coefficients. Z represents the distance from an arbitrary point on the aspherical surface of the lens to the vertex of the aspherical surface.

The optical imaging system including the first to seventh lenses may have negative/negative/positive/positive/negative/positive/negative refractive power in order from the object side. Alternatively, the optical imaging system may have negative/positive/positive/positive/negative/positive/positive refractive power. Alternatively, the optical imaging system may have negative/negative/positive/positive/negative/positive/positive refractive power.

The first lens may have negative refractive power, an object-side surface of the first lens may have a convex shape, and an image-side surface of the first lens may have a concave shape.

In an example, the second lens may have negative refractive power, an object-side surface of the second lens may have a concave shape, and an image-side surface of the second lens may have a convex shape.

In another example, the second lens may have positive refractive power, an object-side surface of the second lens may have a convex shape, and an image-side surface of the second lens may have a concave shape.

The third lens may have positive refractive power, an object-side surface of the third lens may have a convex shape, and an image-side surface of the third lens may have a convex shape.

The fourth lens may have positive refractive power, and an image-side surface of the fourth lens may have a convex shape.

In an example, the fifth lens may have negative refractive power, an object-side surface of the fifth lens may have a concave shape, and an image-side surface of the fifth lens may have a concave shape.

In an example, the sixth lens may have positive refractive power, an object-side surface of the sixth lens may have a convex shape, and an image-side surface of the sixth lens may have a convex shape. The sixth lens may have at least one inflection point on at least one of the object-side surface and the image-side surface. For example, the object-side surface of the sixth lens may be convex in the paraxial region and concave in a region other than the paraxial region. The image-side surface of the sixth lens may be convex in the paraxial region and concave in a region other than the paraxial region.

In an example, an object-side surface of the seventh lens may have a convex shape, and an image-side surface of the seventh lens may have a concave shape. The seventh lens may have at least one inflection point on at least one of the object-side surface and the image-side surface. For example, the object-side surface of the seventh lens may be convex in a paraxial region and concave in a region other than the paraxial region. The image-side surface of the seventh lens may be concave in the paraxial region and convex in a region other than the paraxial region.

A lens constituting the optical imaging system according to an example may be formed of a plastic or glass material. For example, the first lens and the third lens may be formed of glass, and the other lenses may be formed of plastic. In another example, the third lens may be formed of glass and the other lenses may be formed of plastic.

Plastic lenses have the advantage of having relatively high precision while being manufactured in large quantities using a mold. However, the plastic lens has a disadvantage in that the refractive index change or the degree of thermal expansion according to temperature is greater than that of the glass lens. For example, the refractive index of a plastic lens changes 50 to 100 times greater than that of a glass lens depending on the temperature, and the linear expansion coefficient is about 10 times higher. Due to these drawbacks, there is a limitation in applying a plastic lens to a vehicle camera that should secure an operating temperature of −40 degrees Celsius (° C.) to +80 degrees Celsius (° C.).

According to an example of the present disclosure, in an optical imaging system comprised of a plurality of lenses, a glass lens and a plastic lens may be appropriately disposed in consideration of the effect of the refractive power of respective lenses on the focal length. Accordingly, even in the case in which the temperature around the lens changes, the focus of the optical system may be maintained.

The present disclosure provides an optical imaging system in which a change in a back focal length (hereinafter, referred to as 'BFL') in a temperature range of −40 (° C.) to 80 (° C.) is within 10 μm. In this case, BFL refers to the distance between the image-side surface of the lens closest to the image plane, and the image plane.

In an example, a glass lens may be used in a portion having a great optical refractive power, and a plastic lens may be disposed in the remaining portion. For example, a third lens disposed near the aperture stop AS and having a relatively strong refractive power may be formed of glass, and the remaining lenses may be formed of plastic. In another example, the first lens and the third lens exposed externally may be formed of glass, and the other lenses may be formed of plastic.

The optical imaging system according to an example may be configured by properly combining a plastic lens and a glass lens, and accordingly, the BFL change amount in a wide operating temperature range of −40 degrees Celsius (° C.) to 80 degrees Celsius (° C.) may be limited to within 10 μm.

In an example, the optical system may include an image plane IP (or image sensor IS) having a diagonal length of about 6 mm. In an example, the optical system may be configured to have a total length of 15 mm or less.

In an example, the optical system may be characterized in that a lens that may generate images with a resolving power of 80 lp/mm or more may be used, such that the length of the entire optical system is shortened to 15 mm or less. Thus, the optical system may be easily installed in mobile devices or the like. When the pattern corresponding to the spatial frequency of 80 lp/mm is properly imaged on the image plane, it can be seen that a resolution of 1/960 of the diagonal length of the sensor of 6 mm is secured. Therefore, when the camera system is configured with a total field of view of 120 degrees, an angular resolution of 0.125 degrees may be secured, thereby securing a resolving power capable of distinguishing objects at intervals of about 20 cm at a distance of 10 m.

The optical system according to an example includes a total of 7 lenses comprised of a plastic lens and a glass lens, and may obtain a required sufficient level of resolving power at a wide operating temperature of −40 degrees Celsius (° C.) to +80 degrees Celsius (° C.) by suppressing the BFL change.

The optical imaging system may satisfy one or more of the following conditional expressions.

In an example, a hybrid optical imaging system is provided, in which a glass lens and a plastic lens are used together and which controls a change in BFL according to temperature in a manner of optimizing the refractive power of each lens to satisfy Conditional expression (1).

$$|Pnu|[10^{-6}° \text{ C.}^{-1} \text{ mm}^{-1}] \leq 30 \tag{1}$$

Pnu is an index representing the change in refractive power according to the temperature of the entire optical imaging system, and is defined as the sum (i.e., $Pnu=\Sigma Pnui$, $i=1, 2, \ldots, 7$) of Pnu values of the lenses constituting the optical system. The Pnu value (i.e., Pnui) of the i-th lens from the object side is defined as $1/(vti \cdot fi)$. For example, the Pnu value of the entire optical imaging system is calculated as $\Sigma 1/(vti \cdot fi)$ ($i=1, 2, \ldots, 7$).

vti is $[DTni/(ni-1)-CTEi]^{-1}$ (° C.), fi is the effective focal length of the i-th lens, ni is the refractive index of the i-th lens, and DTni is the rate (dni/dT) of change of the refractive index according to the temperature of the i-th lens, and CTEi is the coefficient of thermal expansion of the i-th lens.

In an example, the third lens closest to the aperture stop AS is formed of glass, and the optical imaging system may satisfy Conditional Expression (2). For example, the effective focal length of the third lens may be 0.4 times or more the effective focal length of the entire optical imaging system.

$$f/f3 \geq 0.4 \tag{2}$$

In the above conditional expression, f is an effective focal length of the entire optical imaging system, and fc may be a DTn value of the third lens.

In an example, the optical imaging system may satisfy Conditional Expression (3). In an example, the optical imaging system is configured such that the change (Pnu3) in refractive power of the third lens according to the temperature is sufficiently smaller than the change (Pnu) in refractive power of the entire optical system according to the temperature. Accordingly, a BFL change in the relatively wide temperature range may be suppressed to 10 μm or less.

$$|Pnu3/Pnu| < 0.2 \tag{3}$$

In an example, the optical imaging system may additionally satisfy one or more of the following conditional expressions (4) to (8).

$$-2.0 < \Sigma 1/(DTni \cdot fi)[10^{4°} \text{ C. mm}^{-1}] < 20.0$$
$$(i=1,2,\ldots,7) \tag{4}$$

$$0.2 < DTnF/DTnR < 0.6 \quad (5)$$

$$0.3-620 < DTnT[10^{-6\circ} \text{ C.}^{-1}] \leftarrow 450 \quad (6)$$

$$-220 < DTnF[10^{-6\circ} \text{ C.}^{-1}] \leftarrow 100 \quad (7)$$

$$-400 < DTnR[10^{-6\circ} \text{ C.}^{-1}] \leftarrow 300 \quad (8)$$

DTnT is the sum (i.e., ΣDTni (i=1, 2, . . . , 7)) of DTn values of the first to seventh lenses, DTnF is the sum (i.e., ΣDTni (i=1, 2)) of the DTn values of the first and second lenses, DTnR is the sum (i.e., ΣDTni (i=3, 4, . . . , 7)) of the DTn values of the third to seventh lenses, and IMGHT is half of the diagonal length of the image plane IP.

Hereinafter, examples will be described in detail with reference to the accompanying drawings.

Figure 2:
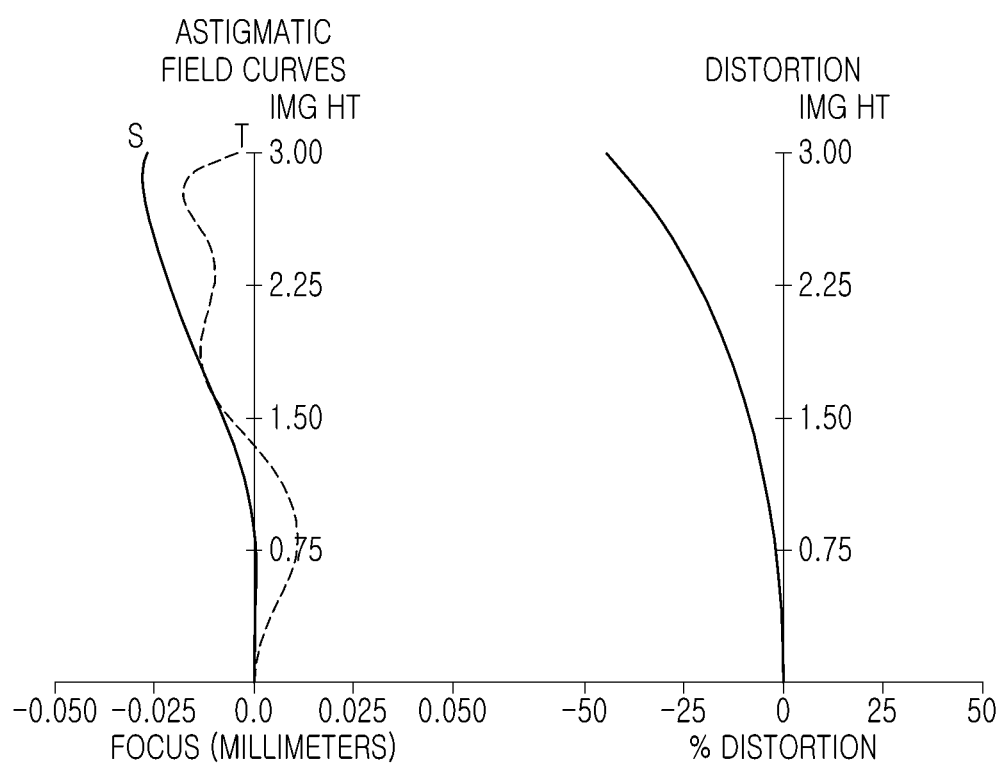
FIG. 2 is a graph illustrating aberrations of the optical imaging system according to the first example.
Figure 3:
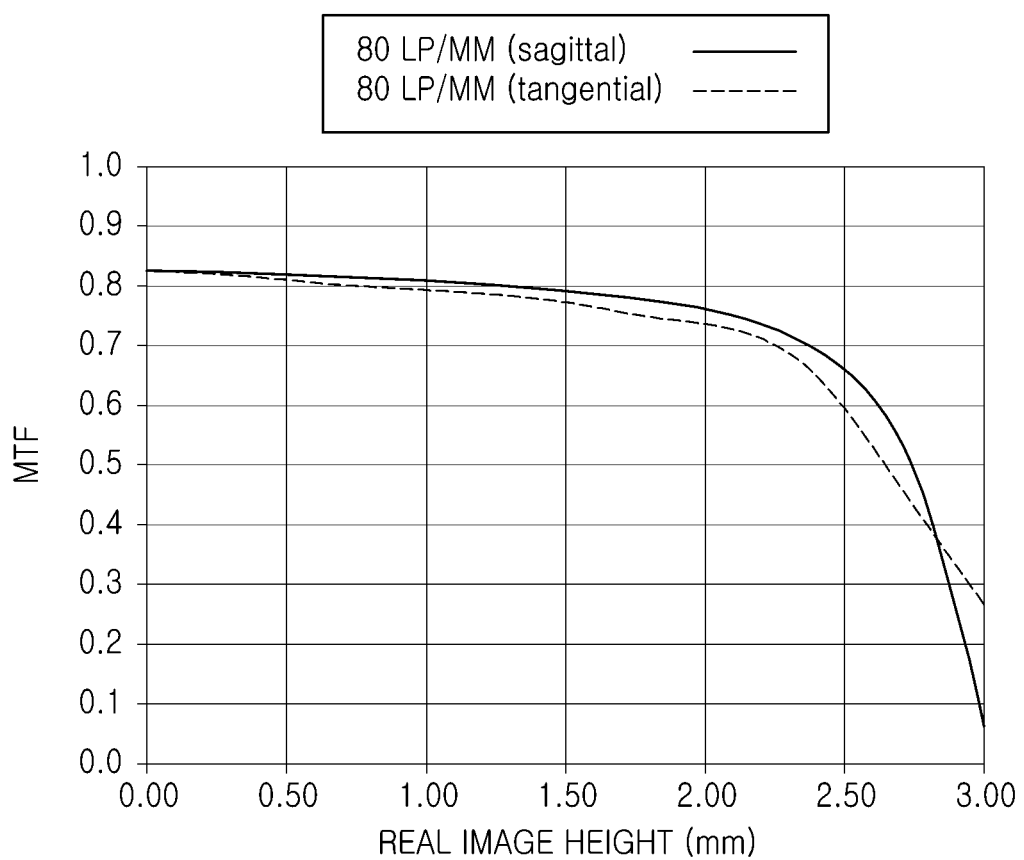
FIG. 3 is a graph illustrating a resolving power according to a field of the optical imaging system according to the first example.
Figure 4:
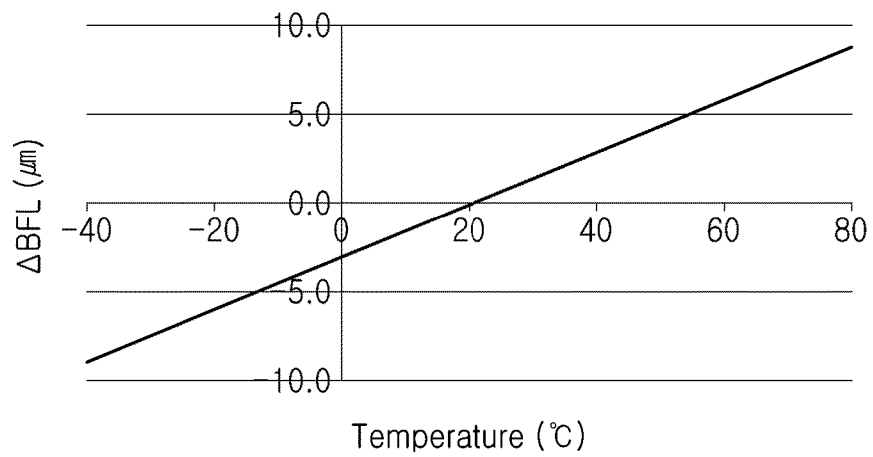
FIG. 4 is a graph illustrating a change in BFL according to temperature in the optical imaging system according to the first example.

FIG. 1 illustrates an optical imaging system 100 according to a first example. FIG. 2 is a graph illustrating aberrations of the optical imaging system 100. FIG. 3 is a graph illustrating a resolving power according to a field of the optical imaging system 100. FIG. 4 is a graph illustrating a change in BFL according to temperature in the optical imaging system 100.

The optical imaging system 100 includes a first lens 110, a second lens 120, a third lens 130, a fourth lens 140, a fifth lens 150, a sixth lens 160 and a seventh lens 170, and may further include an aperture stop AS, a filter IRCF, and an image plane IF. A separate filter F may be additionally disposed on the image plane IP. The filter (F) may be used to protect the image plane IP. In an example, the aperture stop AS is located between the second lens 120 and the third lens 130.

In an example, the first lens 110 and the third lens 130 are formed of glass, and the other lenses are formed of plastic.

Table 1 illustrates the characteristics (radius of curvature, thickness of the lens or distance between lenses, refractive index, Abbe's number, and focal length) of respective lenses. Table 1 further illustrates the refractive index change rate (dn/dT) according to the temperature of each lens, coefficient of thermal expansion (CTE), and vt values.

The first lens 110 has negative refractive power, the object-side surface of the first lens 110 is convex, and the image-side surface of the first lens 110 is concave.

The second lens 120 has negative refractive power, the object-side surface of the second lens 120 is concave, and the image-side surface of the second lens 120 is convex.

The third lens 130 has positive refractive power, the object-side surface of the third lens 130 is convex, and the image-side surface of the third lens 130 is convex.

The fourth lens 140 has positive refractive power, the object-side surface of the fourth lens 140 is convex, and the image-side surface of the fourth lens 140 is convex.

The fifth lens 150 has negative refractive power, the object-side surface of the fifth lens 150 is concave, and the image-side surface of the fifth lens 150 is concave.

The sixth lens 160 has positive refractive power, the object-side surface of the sixth lens 160 is convex, and the image-side surface of the sixth lens 160 is convex.

The seventh lens 170 has negative refractive power, the object-side surface of the seventh lens 170 is convex, and the image-side surface of the seventh lens 170 is concave. The seventh lens 170 may have at least one inflection point on at least one of the object-side surface and the image-side surface. For example, the object-side surface of the seventh lens 170 may be convex in the paraxial region and concave in a region other than the paraxial region. The image-side surface of the seventh lens 170 may be concave in the paraxial region and convex in a region other than the paraxial region.

Respective surfaces of the second lens 120 and the fourth lens 140 to the seventh lens 170 have aspheric coefficients as illustrated in Table 2.

TABLE 1

| Surface number | Radius of curvature (mm) | Thickness, Distance (mm) | Refractive index (nd) | Abbe's number (Vd) | DTn ($10^{-6}/°$ C.) | CTE ($10^{-6}/°$ C.) | vt ($10^{3}$ ° C.) |
|---|---|---|---|---|---|---|---|
| 1 | 10.065 | 0.550 | 1.5286 | 76.97 | −8.1 | 8.0 | −42.9 |
| 2 | 2.140 | 1.782 | | | | | |
| 3 | −3.273 | 1.355 | 1.6612 | 20.35 | −115.0 | 66.0 | −4.2 |
| 4 | −4.641 | 0.148 | | | | | |
| 5 (A.S.) | Infinity | −0.048 | — | — | — | — | — |
| 6 | 10.702 | 1.400 | 1.755 | 52.3 | 3.0 | 8.0 | −248.4 |
| 7 | −6.281 | 1.044 | | | | | |
| 8 | 5.916 | 1.400 | 1.5365 | 55.91 | −93.3 | 60.0 | −4.3 |
| 9 | −16.728 | 0.100 | | | | | |
| 10 | −7.692 | 0.543 | 1.6612 | 20.35 | −115.0 | 66.0 | −4.2 |
| 11 | 4.993 | 0.103 | | | | | |
| 12 | 4.031 | 1.600 | 1.5365 | 55.91 | −93.3 | 60.0 | −4.3 |
| 13 | −5.164 | 0.103 | | | | | |
| 14 | 6.588 | 1.200 | 1.5365 | 55.91 | −93.3 | 60.0 | −4.3 |
| 15 | 4.676 | 1.000 | | | | | |
| 16 | Infinity | 0.400 | 1.5168 | 64.17 | 1.6 | 8.0 | −203.9 |
| 17 | Infinity | 0.899 | | | | | |
| 18 | Infinity | 0.400 | 1.5168 | 64.17 | 1.6 | 8 | −203.9 |
| 19 | Infinity | 0.010 | | | | | |
| 20 | Infinity | 0.000 | — | — | — | — | — |

TABLE 2

| Surface number | K | A | B | C | D |
|---|---|---|---|---|---|
| 3 | 0.0 | −7.7417E−03 | 3.6733E−04 | 0.0 | 0.0 |
| 4 | 0.0 | −3.5340E−03 | 5.1309E−04 | 0.0 | 0.0 |
| 8 | 0.0 | −4.1101E−03 | 4.4925E−04 | 0.0 | 0.0 |
| 9 | 0.0 | −2.4089E−02 | 3.5634E−03 | −2.3645E−04 | 0.0 |
| 10 | 0.0 | −1.1198E−02 | 2.6153E−03 | −2.6752E−04 | 0.0 |
| 11 | 0.0 | −1.4847E−02 | 2.7834E−03 | −1.6924E−04 | 0.0 |
| 12 | 0.0 | −1.7150E−02 | 1.0914E−03 | 1.3242E−04 | −2.1940E−05 |
| 13 | 0.0 | 5.7065E−03 | −7.9412E−04 | 3.2123E−04 | −3.5147E−05 |
| 14 | 0.0 | −2.3283E−02 | 7.9641E−04 | 3.7672E−04 | −4.6014E−05 |
| 15 | 0.0 | −2.7576E−02 | 2.3149E−03 | −1.0547E−04 | −2.2939E−06 |

Referring to FIG. 4, in the optical imaging system 100, the BFL change amount is maintained at a level of 9 μm in a temperature range of −40 degrees Celsius (° C.) to 80 degrees Celsius (° C.).

Figure 5:
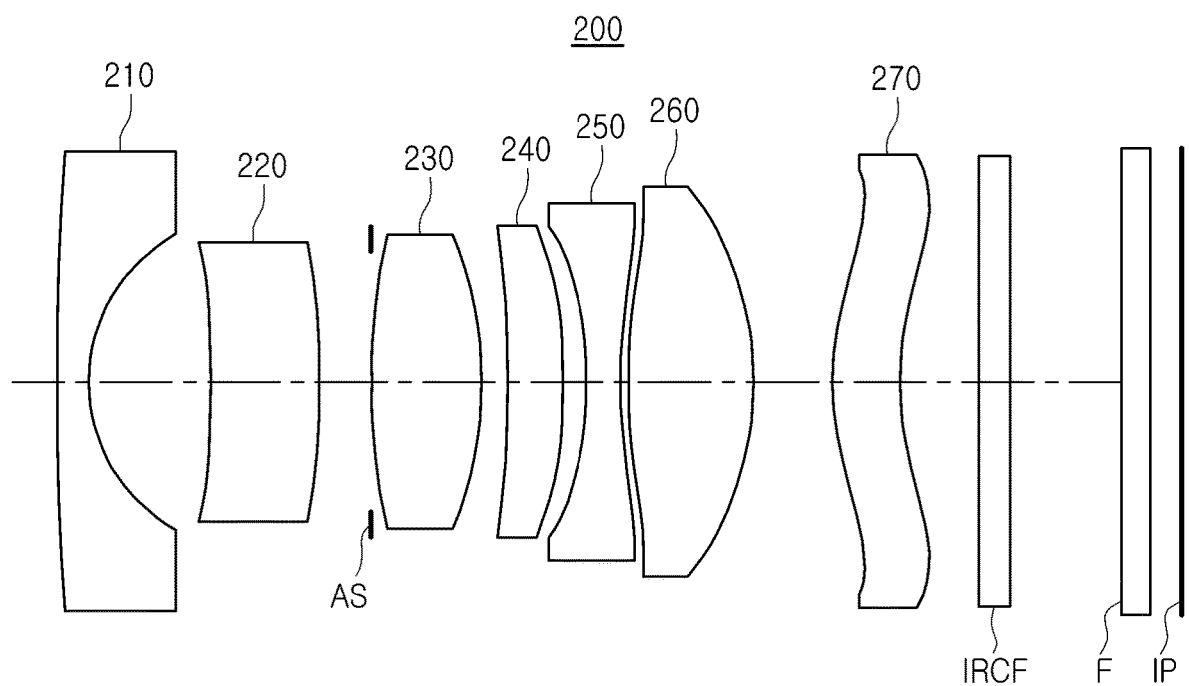
FIG. 5 is a diagram illustrating an optical imaging system according to a second example.
Figure 6:
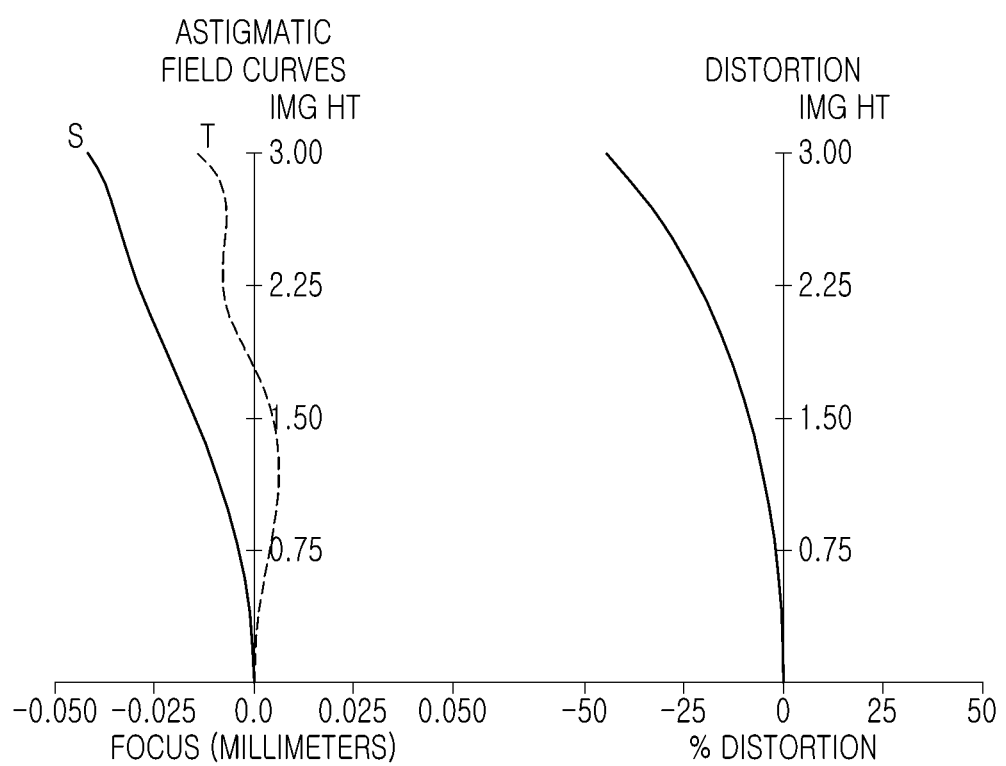
FIG. 6 is a graph illustrating aberrations of the optical imaging system according to the second example.
Figure 7:
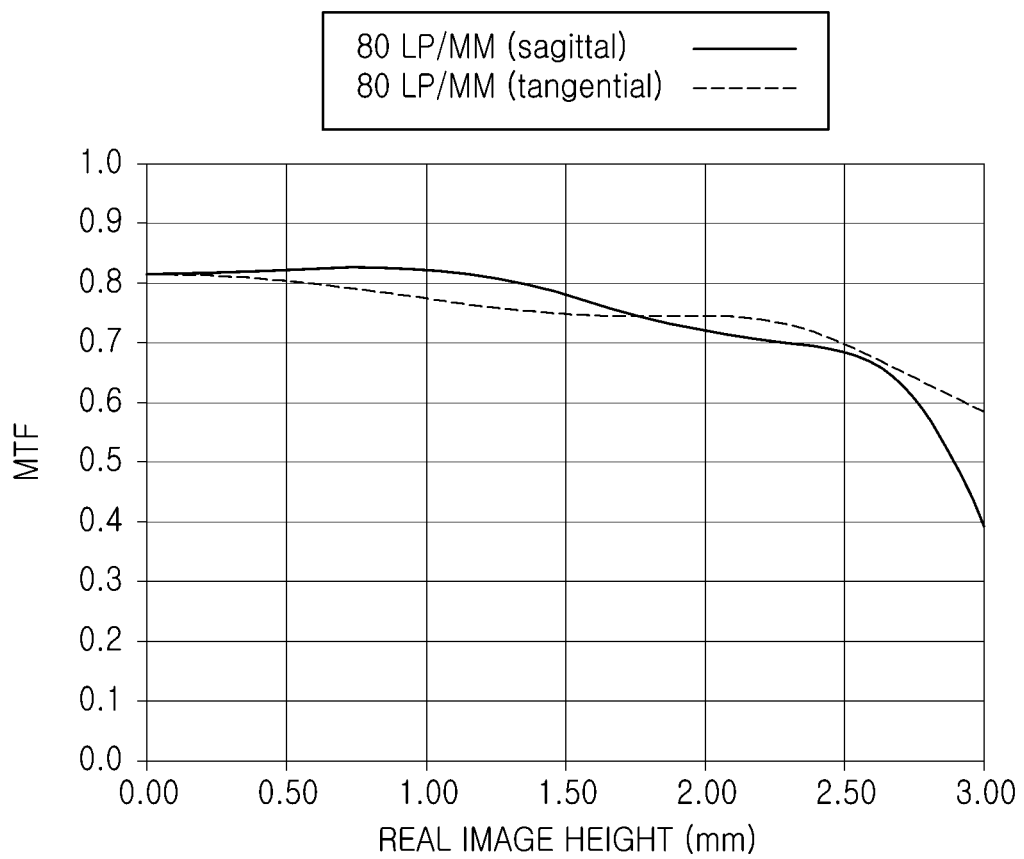
FIG. 7 is a graph illustrating a resolving power according to a field of the optical imaging system according to the second example.
Figure 8:
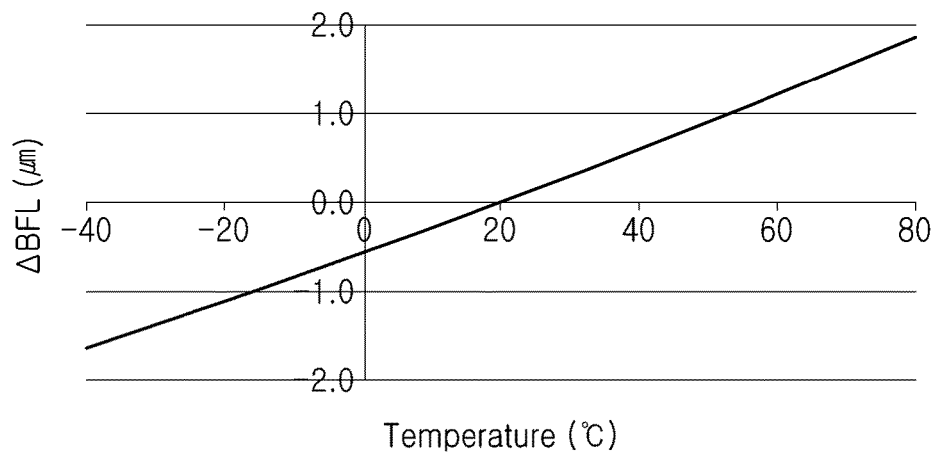
FIG. 8 is a graph illustrating a change in BFL according to temperature in the optical imaging system according to the second example.

FIG. 5 illustrates an optical imaging system 200 according to a second example. FIG. 6 is a graph illustrating aberrations of the optical imaging system 200. FIG. 7 is a graph illustrating a resolving power according to a field of the optical imaging system 200. FIG. 8 is a graph illustrating a change in BFL according to temperature in the optical imaging system 200.

The optical imaging system 200 includes a first lens 210, a second lens 220, a third lens 230, a fourth lens 240, a fifth lens 250, a sixth lens 260, and a seventh lens 270, and may further include an aperture stop AS, a filter IRCF and an image plane IP. A separate filter F may be additionally disposed on the image plane IP. The filter (F) may be used to protect the image plane IP. In an example, the aperture stop AS is located between the second lens 220 and the third lens 230.

In an example, the first lens 210 and the third lens 230 are formed of glass, and the other lenses are formed of plastic.

Table 3 illustrates characteristics of respective lenses (radius of curvature, thickness or distance between lenses, refractive index, Abbe's number, and focal length). Table 3 further illustrates the refractive index change rate (dn/dT) according to the temperature of each lens, coefficient of thermal expansion (CTE), and vt values.

The first lens 210 has negative refractive power, the object-side surface of the first lens 210 is convex, and the image-side surface of the first lens 210 is concave.

The second lens 220 has positive refractive power, the object-side surface of the second lens 220 is concave, and the image-side surface of the second lens 220 is convex.

The third lens 230 has positive refractive power, the object-side surface of the third lens 230 is convex, and the image-side surface of the third lens 230 is convex.

The fourth lens 240 has positive refractive power, the object-side surface of the fourth lens 240 is concave, and the image-side surface of the fourth lens 240 is convex.

The fifth lens 250 has negative refractive power, the object-side surface of the fifth lens 250 is concave, and the image-side surface of the fifth lens 250 is concave.

The sixth lens 260 has positive refractive power, the object-side surface of the sixth lens 260 is convex, and the image-side surface of the sixth lens 260 is convex. The sixth lens 260 may have at least one inflection point on the object-side surface. For example, the object-side surface of the sixth lens 260 may be convex in the paraxial region and concave in a region other than the paraxial region. The image-side surface of the sixth lens 260 may be convex in the paraxial region and concave in a region other than the paraxial region.

The seventh lens 270 has positive refractive power, the object-side surface of the seventh lens 270 is convex, and the image-side surface of the seventh lens 270 is concave. The

TABLE 3

| Surface number | Radius of curvature (mm) | Thickness, Distance (mm) | Refractive index (nd) | Abbe's number (Vd) | DTn ($10^{-6}$/° C.) | CTE ($10^{-6}$/° C.) | vt ($10^3$ ° C.) |
|---|---|---|---|---|---|---|---|
| 1 | 50.000 | 0.400 | 1.5286 | 76.97 | −8.1 | 8.0 | −42.9 |
| 2 | 2.173 | 1.558 | | | | | |
| 3 | −19.267 | 1.400 | 1.6612 | 20.35 | −115.0 | 66.0 | −4.2 |
| 4 | −13.884 | 0.662 | | | | | |
| 5 (A.S.) | Infinity | 0.008 | — | — | — | — | — |
| 6 | 9.358 | 1.400 | 1.7725 | 49.62 | 3.6 | 8.0 | −299.4 |
| 7 | −5.074 | 0.33 | | | | | |
| 8 | −40.136 | 0.711 | 1.5365 | 55.91 | −93.3 | 60.0 | −4.3 |
| 9 | −10.535 | 0.300 | | | | | |
| 10 | −6.209 | 0.441 | 1.6612 | 20.35 | −115.0 | 66.0 | −4.2 |
| 11 | 7.181 | 0.100 | | | | | |
| 12 | 7.135 | 1.600 | 1.5365 | 55.91 | −93.3 | 60.0 | −4.3 |
| 13 | −4.168 | 1.000 | | | | | |
| 14 | 3.551 | 0.878 | 1.5365 | 55.91 | −93.3 | 60.0 | −4.3 |
| 15 | 3.745 | 1.000 | | | | | |
| 16 | Infinity | 0.400 | 1.5168 | 64.17 | 1.6 | 8.0 | −203.9 |
| 17 | Infinity | 1.401 | | | | | |
| 18 | Infinity | 0.400 | 1.5168 | 64.17 | 1.6 | 8.0 | −203.9 |
| 19 | Infinity | 0.012 | | | | | |
| 20 | Infinity | 0.000 | — | — | — | — | — | seventh lens 270 may have at least one inflection point on at least one of the object-side surface and the image-side surface. For example, the object-side surface of the seventh lens 270 may be convex in a paraxial region and concave in a region other than the paraxial region. The image-side surface of the seventh lens 270 may be concave in the paraxial region and convex in a region other than the paraxial region.

Respective surfaces of the second lens 220 and the fourth lens 240 to the seventh lens 270 have an aspherical surface coefficient as illustrated in Table 4.

TABLE 4

| Surface number | K | A | B | C |
|---|---|---|---|---|
| 3 | −1.9178E+00 | −6.8773E−03 | −4.8305E−05 | −1.7677E−05 |
| 4 | 9.2986E−01 | −4.3618E−03 | 1.2975E−04 | 6.0999E−05 |
| 8 | −5.4817E+01 | −1.1096E−02 | 1.1958E−03 | 7.1589E−05 |
| 9 | 2.2549E+01 | −1.5180E−02 | 2.4476E−03 | 9.4191E−05 |
| 10 | 6.9512E+00 | −7.2864E−03 | 1.2951E−03 | 0.0 |
| 11 | −2.5817E+01 | −8.0063E−04 | 2.7939E−04 | −1.2485E−04 |
| 12 | −8.6693E+00 | −4.5403E−03 | 1.0275E−03 | −1.7864E−04 |
| 13 | 0.0 | −1.2453E−03 | 4.1014E−04 | −4.3439E−05 |
| 14 | 0.0 | −1.4026E−02 | 8.8105E−05 | −6.5722E−05 |
| 15 | 0.0 | −1.3579E−02 | −1.9796E−04 | −1.6600E−05 |

Referring to FIG. 8, in the optical imaging system 200, the BFL change amount is maintained at a level of 2 μm in a temperature range of −40 degrees Celsius (° C.) to 80 degrees Celsius (° C.).

Figure 9:
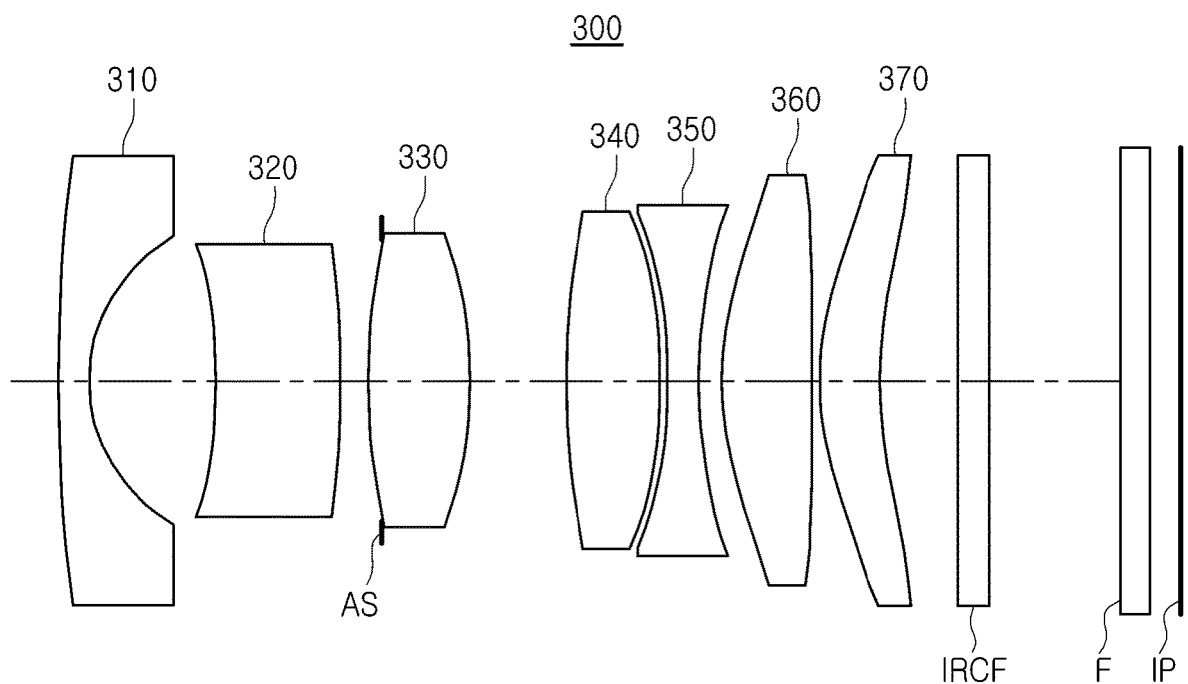
FIG. 9 is a diagram illustrating an optical imaging system according to a third example.
Figure 10:
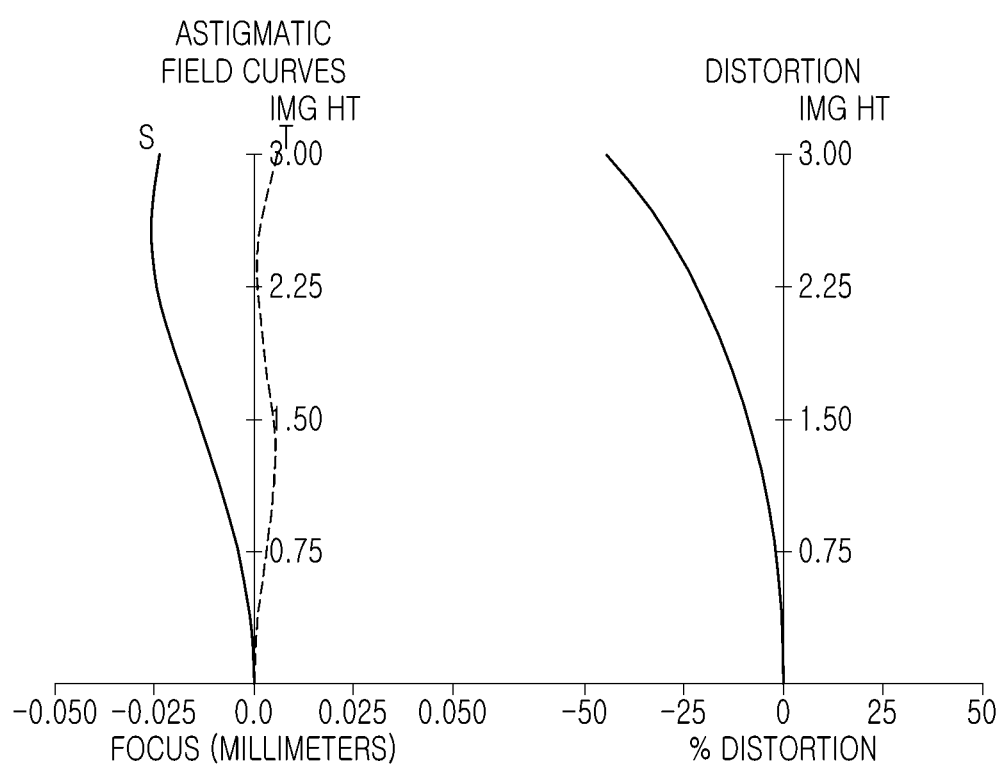
FIG. 10 is a graph illustrating aberrations of the optical imaging system according to the third example.
Figure 11:
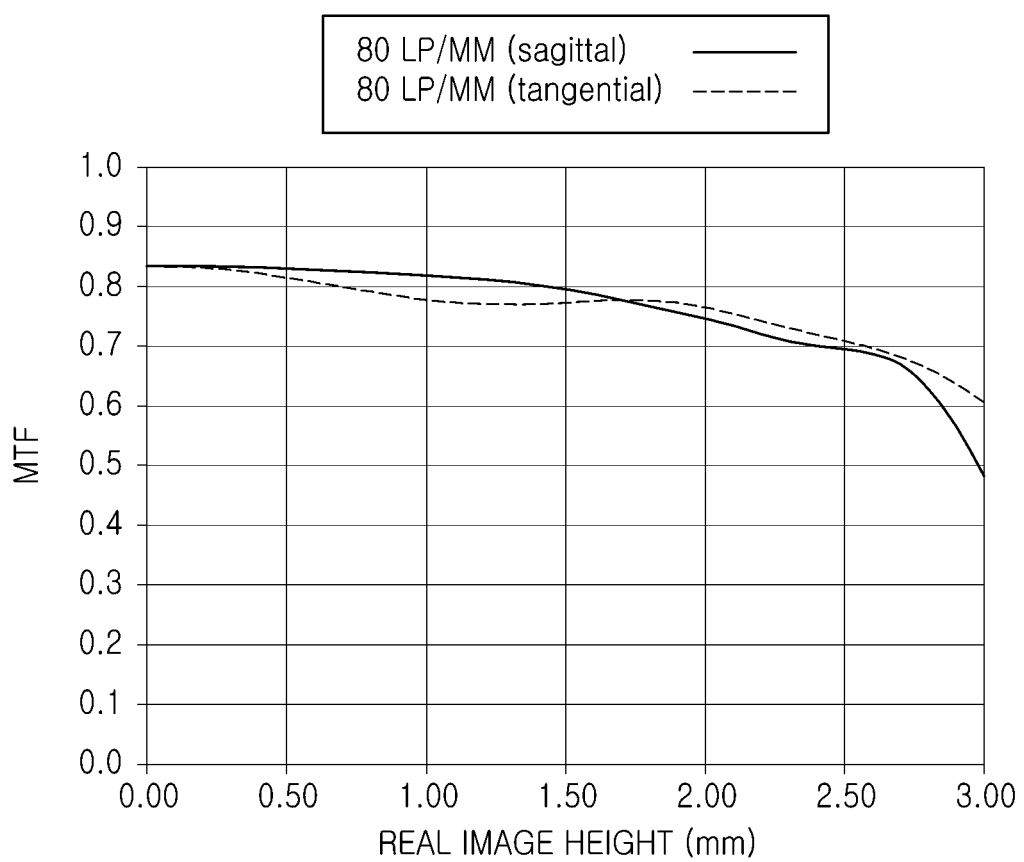
FIG. 11 is a graph illustrating a resolving power according to a field of the optical imaging system according to the third example.
Figure 12:
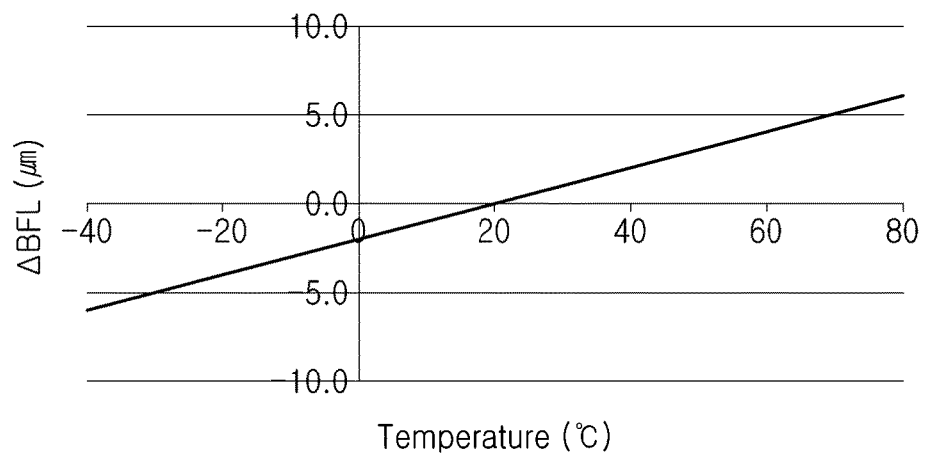
FIG. 12 is a graph illustrating a change in BFL according to temperature in the optical imaging system according to the third example.

FIG. 9 illustrates an optical imaging system 300 according to a third example. FIG. 10 is a graph illustrating aberrations of the optical imaging system 300. FIG. 11 is a graph illustrating a resolving power according to a field of the optical imaging system 300. FIG. 12 is a graph illustrating a change in BFL according to temperature in the optical imaging system 300.

The optical imaging system 300 includes a first lens 310, a second lens 320, a third lens 330, a fourth lens 340, a fifth lens 350, a sixth lens 360 and a seventh lens 370, and may further include an aperture stop AS, a filter IRCF and an image plane IP. A separate filter F may be additionally disposed on the image plane IP. The filter (F) may be used to protect the image plane IP. In an example, the aperture stop AS is positioned between the second lens 320 and the third lens 330.

In an example, the first lens 310 and the third lens 330 are formed of glass, and the other lenses are formed of plastic.

Table 5 illustrates characteristics of each lens (radius of curvature, thickness of the lens or distance between lenses, refractive index, Abbe's number, and focal length). Table 5 further illustrates the refractive index change rate (dn/dT) according to the temperature of each lens, coefficient of thermal expansion (CTE), and vt values.

TABLE 5

| Surface number | Radius of curvature (mm) | Thickness, Distance (mm) | Refractive index (nd) | Abbe's number (Vd) | DTn ($10^{-6}/°$ C.) | CTE ($10^{-6}/°$ C.) | vt ($10^3$ ° C.) |
|---|---|---|---|---|---|---|---|
| 1 | 22.395 | 0.400 | 1.5286 | 76.97 | −8.1 | 8.0 | −42.9 |
| 2 | 2.125 | 1.622 | | | | | |
| 3 | −8.248 | 1.600 | 1.6612 | 20.35 | −115.0 | 66.0 | −4.2 |
| 4 | −15.060 | 0.536 | | | | | |
| 5(A.S.) | Infinity | −0.178 | — | — | — | — | — |
| 6 | 8.739 | 1.299 | 1.7725 | 49.62 | 3.9 | 8.0 | −338.8 |
| 7 | −5.711 | 1.235 | | | | | |
| 8 | 10.005 | 1.196 | 1.5348 | 55.72 | −94.7 | 60.0 | −4.2 |
| 9 | −13.751 | 0.100 | | | | | |
| 10 | −9.201 | 0.400 | 1.6612 | 20.35 | −115.0 | 66.0 | −4.2 |
| 11 | 5.585 | 0.294 | | | | | |
| 12 | 3.721 | 1.154 | 1.5348 | 55.72 | −94.7 | 60.0 | −4.2 |
| 13 | −30.826 | 0.100 | | | | | |
| 14 | 3.659 | 0.769 | 1.5348 | 55.72 | −94.7 | 60.0 | −4.2 |
| 15 | 4.785 | 1.000 | | | | | |
| 16 | Infinity | 0.400 | 1.5168 | 64.17 | 1.6 | 8.0 | −203.9 |
| 17 | Infinity | 1.661 | | | | | |
| 18 | Infinity | 0.400 | 1.5168 | 64.17 | 1.6 | 8 | −203.9 |

TABLE 5-continued

| Surface number | Radius of curvature (mm) | Thickness, Distance (mm) | Refractive index (nd) | Abbe's number (Vd) | DTn ($10^{-6}$/° C.) | CTE ($10^{-6}$/° C.) | vt ($10^3$ ° C.) |
|---|---|---|---|---|---|---|---|
| 19 | Infinity | 0.011 | | | | | |
| 20 | Infinity | 0.000 | — | — | — | — | — |

The first lens 310 has negative refractive power, the object-side surface of the first lens 310 is convex, and the image-side surface of the first lens 310 is concave.

The second lens 320 has negative refractive power, the object-side surface of the second lens 320 is concave, and the image-side surface of the second lens 320 is convex.

The third lens 330 has positive refractive power, the object-side surface of the third lens 330 is convex, and the image-side surface of the third lens 330 is convex.

The fourth lens 340 has positive refractive power, the object-side surface of the fourth lens 340 is convex, and the image-side surface of the fourth lens 340 is convex.

The fifth lens 350 has negative refractive power, the object-side surface of the fifth lens 350 is concave, and the image-side surface of the fifth lens 350 is concave.

The sixth lens 360 has positive refractive power, the object-side surface of the sixth lens 360 is convex, and the image-side surface of the sixth lens 360 is convex.

The seventh lens 370 has positive refractive power, the object-side surface of the seventh lens 370 is convex, and the image-side surface of the seventh lens 370 is concave. The seventh lens 370 may have at least one inflection point on the image-side surface.

Respective surfaces of the second lens 320 and the fourth lens 340 to the seventh lens 370 have an aspherical surface coefficient as illustrated in Table 6.

TABLE 6

| Surface number | K | A | B | C |
|---|---|---|---|---|
| 3 | −1.9178E+00 | −7.0218E−03 | 1.1667E−04 | −6.9520E−05 |
| 4 | 9.2986E−01 | −1.9441E−03 | 1.4424E−04 | 1.7388E−05 |
| 8 | −5.4817E+01 | 3.8082E−03 | −4.7042E−04 | 4.3538E−05 |
| 9 | 2.2549E+01 | −1.7490E−02 | 1.9380E−03 | 1.7585E−05 |
| 10 | 6.9512E+00 | −8.9268E−03 | 9.8232E−04 | 0.0 |
| 11 | −2.5817E+01 | 1.1759E−03 | 5.5681E−04 | −2.4010E−05 |
| 12 | −8.6693E+00 | 3.4679E−03 | −8.5176E−04 | 6.2081E−05 |
| 13 | 0.0 | 7.4401E−03 | −1.6447E−03 | 9.6540E−05 |
| 14 | −1.4427E+00 | −8.1046E−03 | 4.1756E−04 | 0.0000E+00 |
| 15 | −7.3782E+00 | −4.1950E−03 | 1.3425E−04 | 0.0000E+00 |

A lens shape in which both a concave shape and a convex shape are present on one surface may be advantageous in making the entire optical imaging system 300 small and correcting image-side field curvature, but has a disadvantage in that it is difficult to manufacture. In the third example, the seventh lens 370 has a relatively simple shape, which may be advantageous in securing mass production.

Referring to FIG. 12, in the optical imaging system 300, the BFL change amount is maintained at a level of 6 μm in a temperature range of μ40 degrees Celsius (° C.) to 80 degrees Celsius (° C.).

Figure 13:
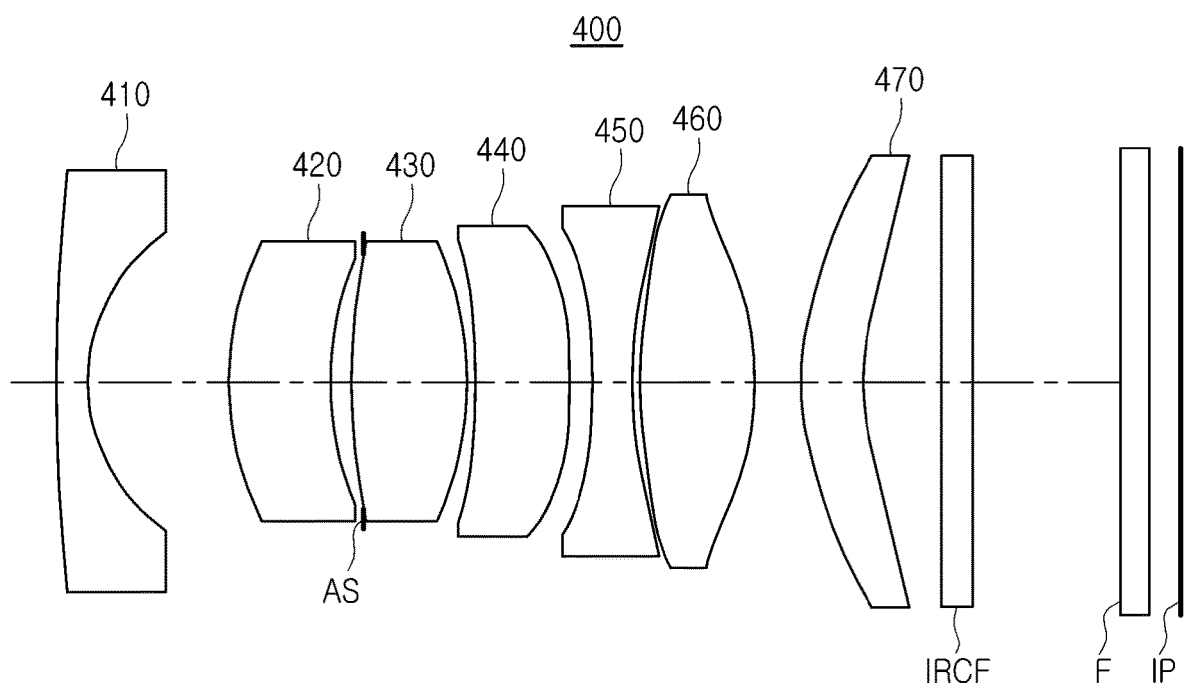
FIG. 13 is a diagram illustrating an optical imaging system according to a fourth example.
Figure 14:
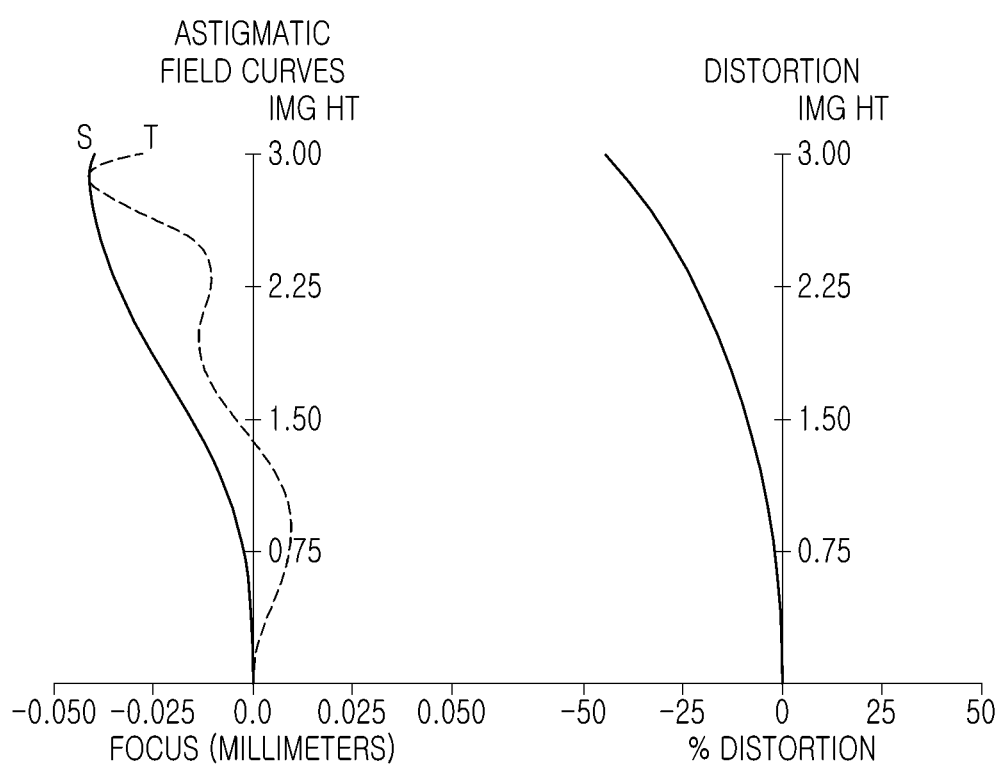
FIG. 14 is a graph illustrating aberrations of the optical imaging system according to the fourth example.
Figure 15:
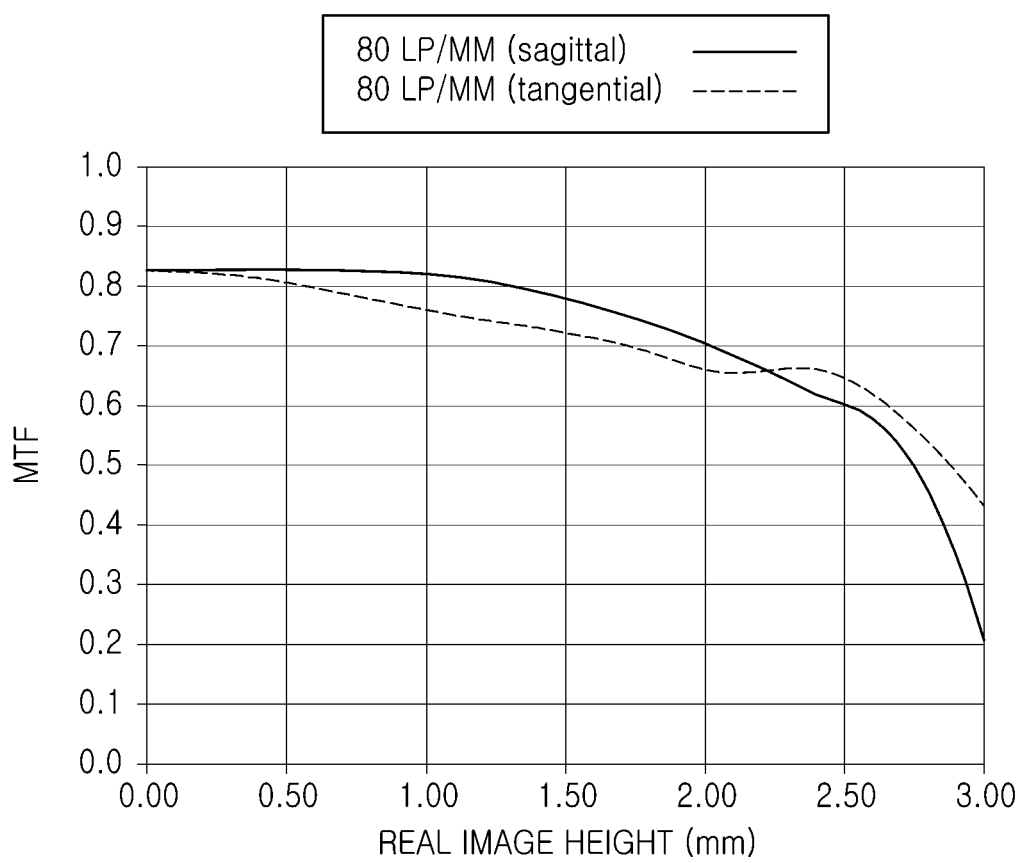
FIG. 15 is a graph illustrating a resolving power according to a field of the optical imaging system according to the fourth example.
Figure 16:
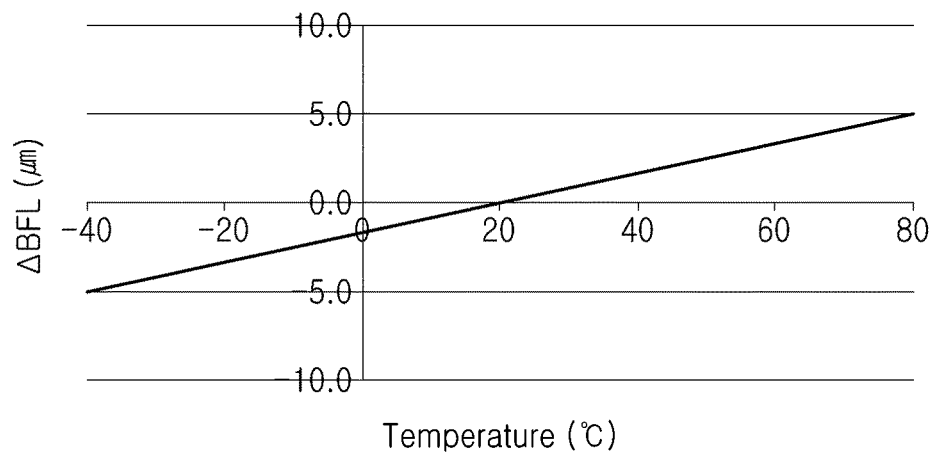
FIG. 16 is a graph illustrating a change in BFL according to temperature in the optical imaging system according to the fourth example.

FIG. 13 is a diagram illustrating an optical imaging system 400 according to a fourth example. FIG. 14 is a graph illustrating aberrations of the optical imaging system 400. FIG. 15 is a graph illustrating a resolving power according to a field of the optical imaging system 400. FIG. 16 is a graph illustrating a change in BFL according to temperature in the optical imaging system 400.

The optical imaging system 400 includes a first lens 410, a second lens 420, a third lens 430, a fourth lens 440, a fifth lens 450, and a sixth lens 460 and a seventh lens 470, and may further include an aperture stop AS, a filter IRCF, and an image plane IP. A separate filter F may be additionally disposed on the image plane IP. The filter (F) may be used to protect the image plane IP. In an example, the aperture stop AS is positioned between the second lens 420 and the third lens 430.

In an example, the first lens 410 and the third lens 430 are formed of glass, and the other lenses are formed of plastic.

Table 7 illustrates characteristics of each lens (radius of curvature, thickness of the lens or distance between lenses, refractive index, Abbe's number, and focal length). Table 7 further illustrates the refractive index change rate (dn/dT) according to the temperature of each lens, coefficient of thermal expansion (CTE), and vt values.

TABLE 7

| Surface number | Radius of curvature (mm) | Thickness, Distance (mm) | Refractive index (nd) | Abbe's number (Vd) | DTn ($10^{-6}$/° C.) | CTE ($10^{-6}$/° C.) | vt ($10^3$ ° C.) |
|---|---|---|---|---|---|---|---|
| 1 | 29.312 | 0.400 | 1.7725 | 49.62 | 3.6 | 8.0 | −299.4 |
| 2 | 2.353 | 1.799 | | | | | |
| 3 | 3.911 | 1.313 | 1.6612 | 20.35 | −115.0 | 66.0 | −4.2 |
| 4 | 4.189 | 0.416 | | | | | |
| 5(A.S.) | Infinity | −0.143 | — | — | — | — | — |

TABLE 7-continued

| Surface number | Radius of curvature (mm) | Thickness, Distance (mm) | Refractive index (nd) | Abbe's number (Vd) | DTn ($10^{-6}/°$ C.) | CTE ($10^{-6}/°$ C.) | vt ($10^3$ ° C.) |
|---|---|---|---|---|---|---|---|
| 6 | 8.933 | 1.468 | 1.835 | 43.13 | 3.8 | 8.0 | −289.9 |
| 7 | −4.389 | 0.100 | | | | | |
| 8 | −25.834 | 1.217 | 1.5345 | 55.68 | −92.7 | 60.0 | −4.3 |
| 9 | −11.961 | 0.300 | | | | | |
| 10 | −6.691 | 0.500 | 1.6612 | 20.35 | −115.0 | 66.0 | −4.2 |
| 11 | 5.642 | 0.100 | | | | | |
| 12 | 5.187 | 1.469 | 1.5345 | 55.68 | −92.7 | 60.0 | −4.3 |
| 13 | −3.76 | 0.589 | | | | | |
| 14 | 3.397 | 0.801 | 1.5348 | 55.72 | −94.7 | 60.0 | −4.2 |
| 15 | 3.383 | 1.000 | | | | | |
| 16 | Infinity | 0.400 | 1.5168 | 64.17 | 1.6 | 8.0 | −203.9 |
| 17 | Infinity | 1.862 | | | | | |
| 18 | Infinity | 0.400 | 1.5168 | 64.17 | 1.6 | 8 | −203.9 |
| 19 | Infinity | 0.012 | | | | | |
| 20 | Infinity | 0.000 | — | — | — | — | — |

The first lens 410 has negative refractive power, the object-side surface of the first lens 410 is convex, and the image-side surface of the first lens 410 is concave.

The second lens 420 has positive refractive power, the object-side surface of the second lens 420 is convex, and the image-side surface of the second lens 420 is concave.

The third lens 430 has positive refractive power, the object-side surface of the third lens 430 is convex, and the image-side surface of the third lens 430 is convex.

The fourth lens 440 has positive refractive power, the object-side surface of the fourth lens 440 is concave, and the image-side surface of the fourth lens 440 is convex.

The fifth lens 450 has negative refractive power, the object-side surface of the fifth lens 450 is concave, and the image-side surface of the fifth lens 450 is concave.

The sixth lens 460 has positive refractive power, the object-side surface of the sixth lens 460 is convex, and the image-side surface of the sixth lens 460 is convex. The sixth lens 460 may have at least one inflection point on the image-side surface.

The seventh lens 470 has positive refractive power, the object-side surface of the seventh lens 470 is convex, and the image-side surface of the seventh lens 470 is concave. The seventh lens 470 may have at least one inflection point on an image-side surface.

Respective surfaces of the second lens 420 and the fourth lens 440 to the seventh lens 470 has an aspherical surface coefficient as illustrated in Table 8.

In the fourth example, the object-side surface of the second lens 420 has a convex meniscus shape. If the object-side surface of the second lens 420 is concave, there may be a disadvantage in that the incident angle of the lower rays of the field having a large field of view increases, so that the entire optical imaging system 400 becomes sensitive. In the fourth example, the above disadvantages may be compensated.

Referring to FIG. 16, in the optical imaging system 400, the BFL change amount is maintained at a level of 5 μm in a temperature range of −40 degrees Celsius (° C.) to 80 degrees Celsius (° C.).

Figure 17:
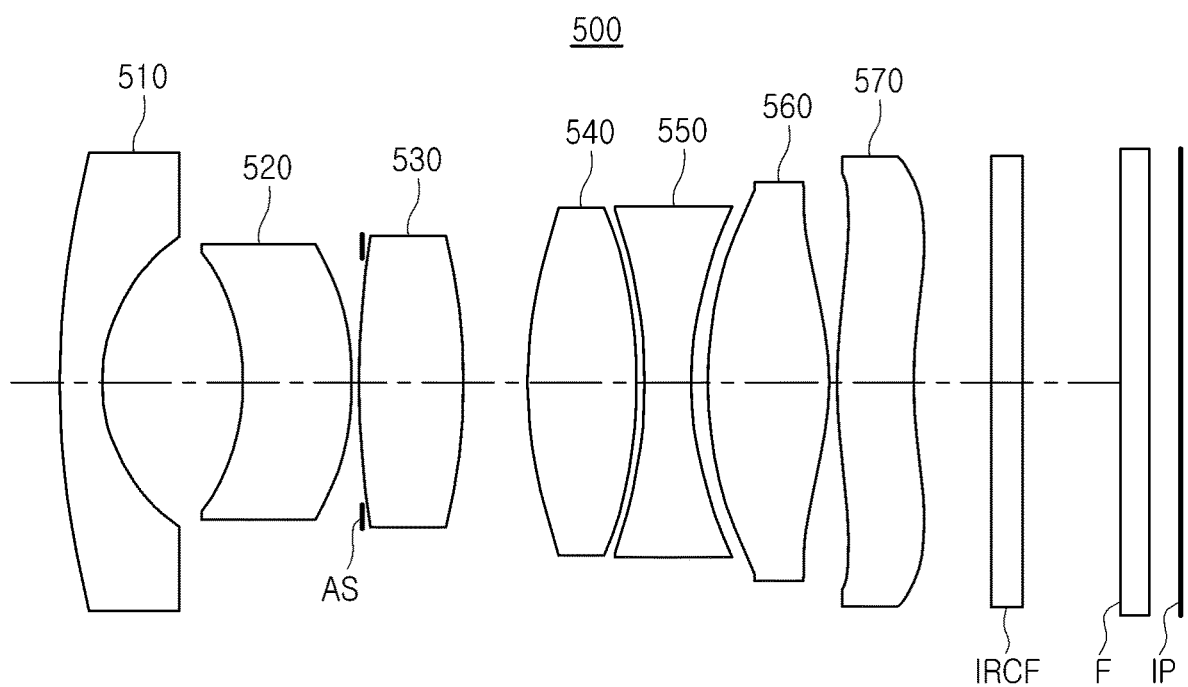
FIG. 17 is a diagram illustrating an optical imaging system according to a fifth example.
Figure 18:
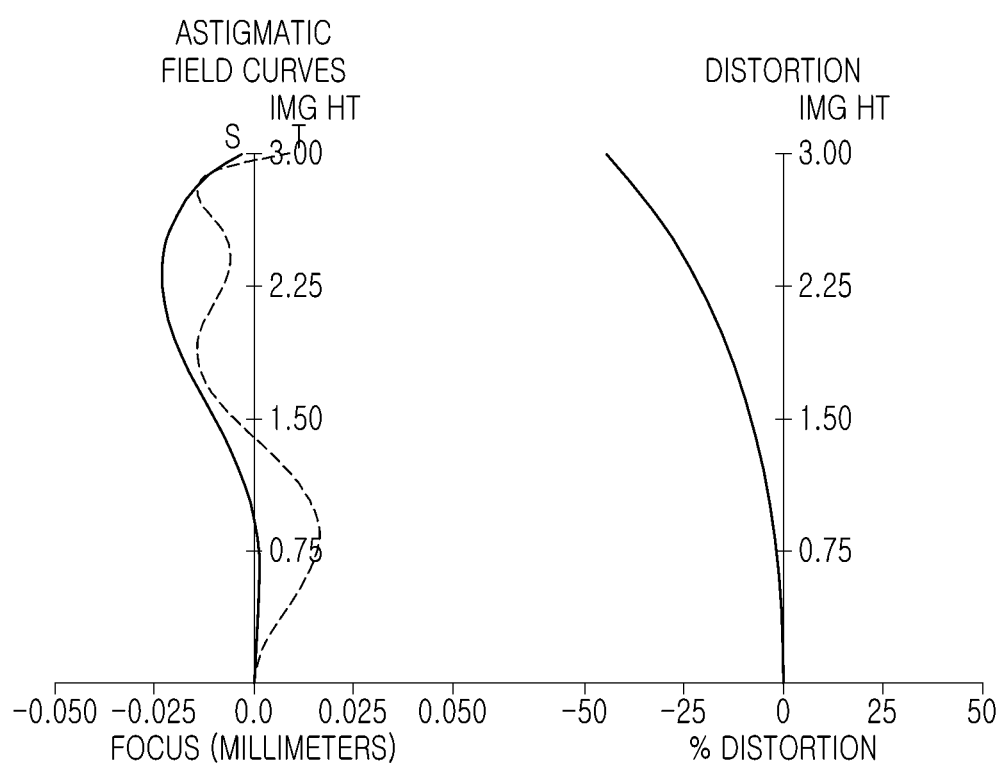
FIG. 18 is a graph illustrating aberrations of the optical imaging system according to the fifth example.
Figure 19:
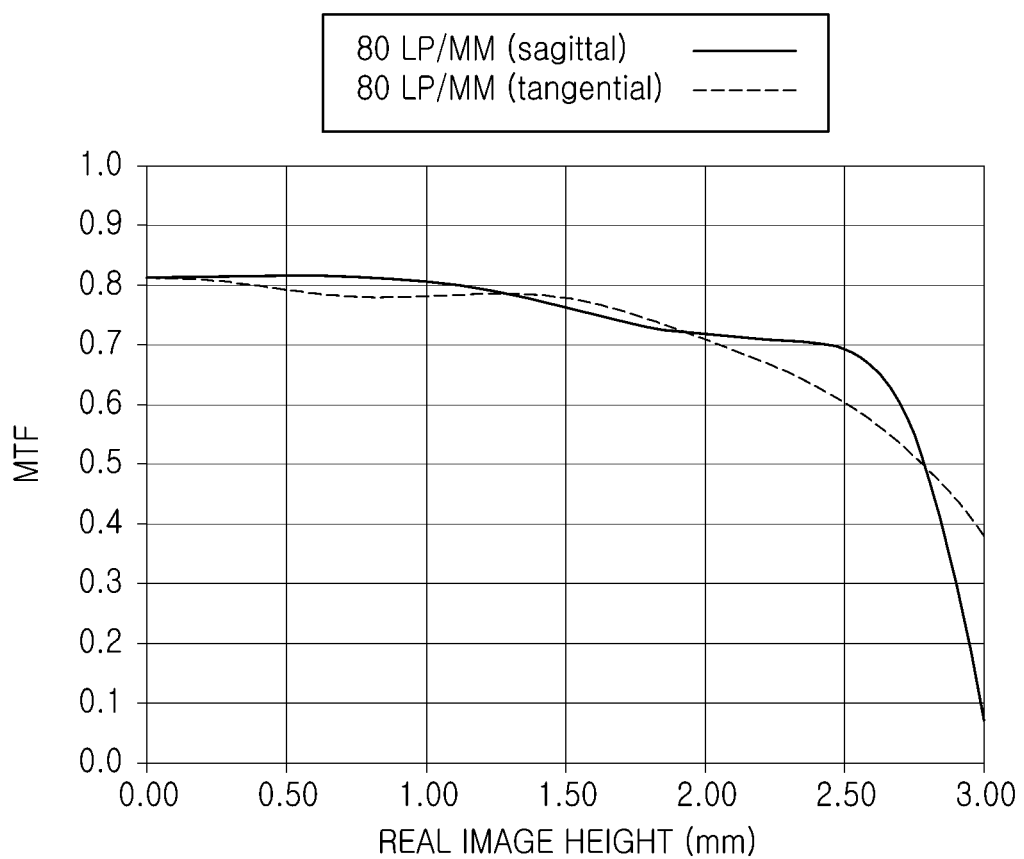
FIG. 19 is a graph illustrating a resolving power according to a field of the optical imaging system according to the fifth example.
Figure 20:
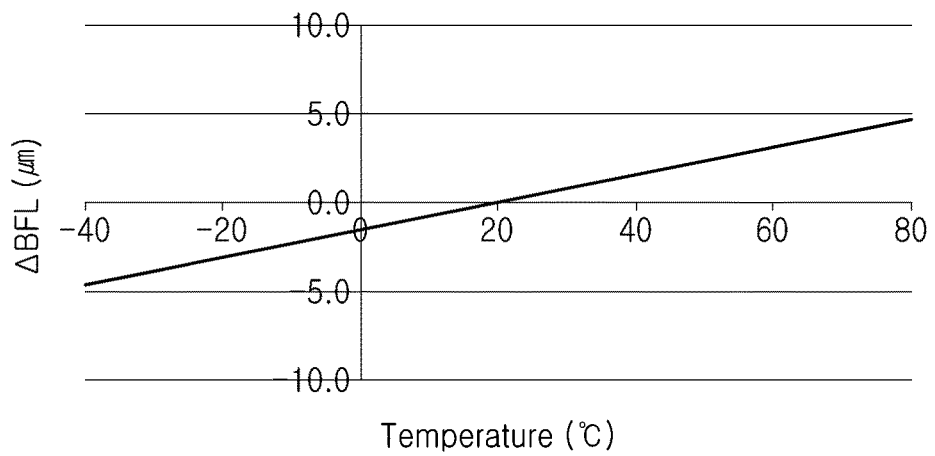
FIG. 20 is a graph illustrating a change in BFL according to temperature in the optical imaging system according to the fifth example.

FIG. 17 illustrates an optical imaging system 500 according to a fifth example. FIG. 18 is a graph illustrating aberrations of the optical imaging system 500. FIG. 19 is a graph illustrating a resolving power according to a field of the optical imaging system 500. FIG. 20 is a graph illustrating a change in BFL according to temperature in the optical imaging system 500.

The optical imaging system 500 includes a first lens 510, a second lens 520, a third lens 530, a fourth lens 540, a fifth lens 550, a sixth lens 560 and a seventh lens 570, and may further include an aperture stop AS, a filter IRCF, and an image plane IP. A separate filter F may be additionally disposed on the image plane IP. The filter (F) may be used to protect the image plane IP. In an example, the aperture stop AS is positioned between the second lens 520 and the third lens 530.

TABLE 8

| Surface number | K | A | B | C |
|---|---|---|---|---|
| 3 | −1.9178E+00 | 1.6847E−03 | 7.9798E−05 | 9.3773E−05 |
| 4 | 9.2986E−01 | −3.0996E−03 | 3.1458E−04 | 2.6065E−04 |
| 8 | −5.4817E+01 | −1.8991E−02 | 7.7995E−04 | 1.8995E−04 |
| 9 | 2.2549E+01 | −3.5607E−02 | 5.3216E−03 | −4.2579E−04 |
| 10 | 6.9512E+00 | 2.8062E−03 | −1.1297E−03 | 0.0 |
| 11 | −2.5817E+01 | 1.3599E−02 | −3.5750E−03 | 2.8194E−04 |
| 12 | −8.6693E+00 | −1.3414E−02 | 2.3052E−03 | −2.5433E−05 |
| 13 | 0.0 | 2.5580E−03 | −1.3568E−04 | 1.6813E−04 |
| 14 | 0.0 | −1.8436E−02 | 2.2527E−03 | −1.5342E−04 |
| 15 | 0.0 | −2.5029E−02 | 2.5506E−03 | −1.5835E−04 |

In an example, the third lens 530 is formed of glass, and the other lenses are formed of plastic. Compared with other examples discussed above, in the fifth example, the first lens 510 is formed of plastic. In the case of an indoor camera that is not exposed externally, even when the first lens 510 is formed of plastic, the optical system may withstand an external impact. As the first lens 510 is formed of plastic, manufacturing costs and weight of the optical system may be reduced.

Table 9 illustrates the characteristics of each lens (radius of curvature, thickness of the lens or distance between lenses, refractive index, Abbe's number, and focal length). Table 9 further illustrates the refractive index change rate (dn/dT) according to the temperature of each lens, coefficient of thermal expansion (CTE), and vt values.

The fifth lens 550 has negative refractive power, the object-side surface of the fifth lens 550 is concave, and the image-side surface of the fifth lens 550 is concave.

The sixth lens 560 has positive refractive power, the object-side surface of the sixth lens 560 is convex, and the image-side surface of the sixth lens 560 is convex. The sixth lens 560 may have at least one inflection point on the image-side surface. For example, the image-side surface of the sixth lens 560 may be convex in the paraxial region and concave in a region other than the paraxial region.

The seventh lens 570 has negative refractive power, the object-side surface of the seventh lens 570 is convex, and the image-side surface of the seventh lens 570 is concave. The

TABLE 9

| Surface number | Radius of curvature (mm) | Thickness, Distance (mm) | Refractive index (nd) | Abbe's number (Vd) | DTn ($10^{-6}/°$ C.) | CTE ($10^{-6}/°$ C.) | vt ($10^3$ ° C.) |
|---|---|---|---|---|---|---|---|
| 1 | 9.067 | 0.550 | 1.5365 | 55.91 | −93.3 | 60.0 | −4.3 |
| 2 | 2.135 | 1.806 | | | | | |
| 3 | −3.211 | 1.400 | 1.6612 | 20.35 | −115.0 | 66.0 | −4.2 |
| 4 | −3.800 | 0.137 | | | | | |
| 5(A.S.) | Infinity | −0.037 | — | — | — | — | — |
| 6 | 12.534 | 1.333 | 1.755 | 52.3 | 3.0 | 8.0 | −248.4 |
| 7 | −7.820 | 0.822 | | | | | |
| 8 | 6.045 | 1.400 | 1.5365 | 55.91 | −93.3 | 60.0 | −4.3 |
| 9 | −8.633 | 0.100 | | | | | |
| 10 | −6.957 | 0.600 | 1.6612 | 20.35 | −115.0 | 66.0 | −4.2 |
| 11 | 4.561 | 0.213 | | | | | |
| 12 | 5.428 | 1.555 | 1.5365 | 55.91 | −93.3 | 60.0 | −4.3 |
| 13 | −3.988 | 0.100 | | | | | |
| 14 | 6.296 | 0.984 | 1.5365 | 55.91 | −93.3 | 60.0 | −4.3 |
| 15 | 4.964 | 1.000 | | | | | |
| 16 | Infinity | 0.400 | 1.5168 | 64.17 | 1.6 | 8.0 | −203.9 |
| 17 | Infinity | 1.227 | | | | | |
| 18 | Infinity | 0.400 | 1.5168 | 64.17 | 1.6 | 8.0 | −203.9 |
| 19 | Infinity | 0.011 | | | | | |
| 20 | Infinity | 0.000 | — | — | — | — | — |

The first lens 510 has negative refractive power, the object-side surface of the first lens 510 is convex, and the image-side surface of the first lens 510 is concave.

The second lens 520 has negative refractive power, the object-side surface of the second lens 520 is concave, and the image-side surface of the second lens 520 is convex.

The third lens 530 has positive refractive power, the object-side surface of the third lens 530 is convex, and the image-side surface of the third lens 530 is convex.

The fourth lens 540 has positive refractive power, the object-side surface of the fourth lens 540 is convex, and the image-side surface of the fourth lens 540 is convex.

seventh lens 570 may have at least one inflection point on at least one of an object-side surface and an image-side surface. For example, the object-side surface of the seventh lens 570 may be convex in a paraxial region and concave in a region other than the paraxial region. The image-side surface of the seventh lens 570 may be concave in the paraxial region and convex in a region other than the paraxial region.

Respective surfaces of the first lens 510, the second lens 520, and the fourth lens 540 to the seventh lens 570 have an aspherical surface coefficient as illustrated in Table 10.

TABLE 10

| Surface number | K | A | B | C | D |
|---|---|---|---|---|---|
| 1 | 0.0 | −3.0840E−03 | 1.7243E−04 | 0.0 | 0.0 |
| 2 | 0.0 | −4.2724E−03 | −1.1762E−03 | 1.8247E−04 | −5.5977E−05 |
| 3 | 0.0 | −7.9443E−03 | 3.0115E−05 | 0.0 | 0.0 |
| 4 | 0.0 | −3.3383E−03 | 2.8733E−04 | 0.0 | 0.0 |
| 8 | 0.0 | −2.3219E−03 | 2.1379E−04 | 0.0 | 0.0 |
| 9 | 0.0 | −9.6846E−03 | 1.4454E−03 | −9.0746E−05 | 0.0 |
| 10 | 0.0 | −7.1012E−03 | 2.2366E−03 | −1.7958E−04 | 0.0 |
| 11 | 0.0 | −5.6064E−03 | 3.2073E−04 | 5.2821E−05 | 0.0 |
| 12 | 0.0 | 3.4063E−03 | −1.5930E−03 | 3.1484E−04 | −2.2605E−05 |
| 13 | 0.0 | 1.3986E−02 | −1.0799E−03 | 4.8465E−04 | −4.8779E−05 |

TABLE 10-continued

| Surface number | K | A | B | C | D |
|---|---|---|---|---|---|
| 14 | 0.0 | −1.3655E−02 | −3.1122E−04 | 3.5269E−04 | −3.3992E−05 |
| 15 | 0.0 | −2.3233E−02 | 1.5920E−03 | −5.9528E−05 | −2.9653E−06 |

Referring to FIG. 20, in the optical imaging system 500, the BFL change amount is maintained at a level of 5 μm.

Figure 21:
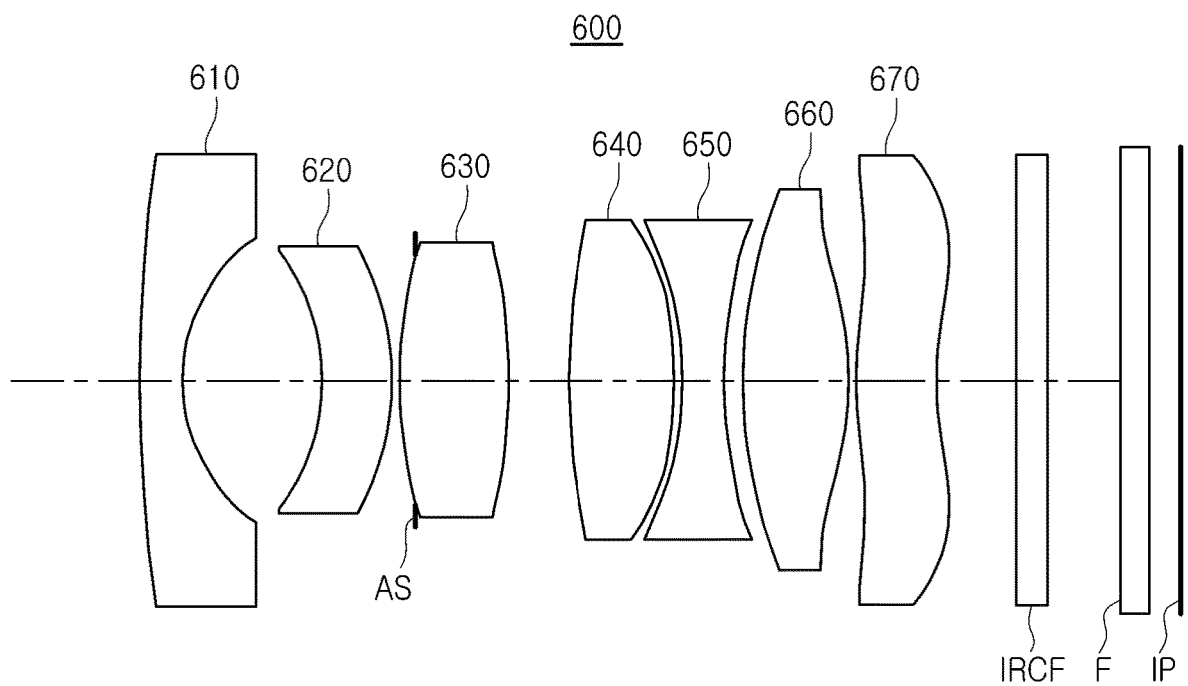
FIG. 21 is a diagram illustrating an optical imaging system according to a sixth example.
Figure 22:
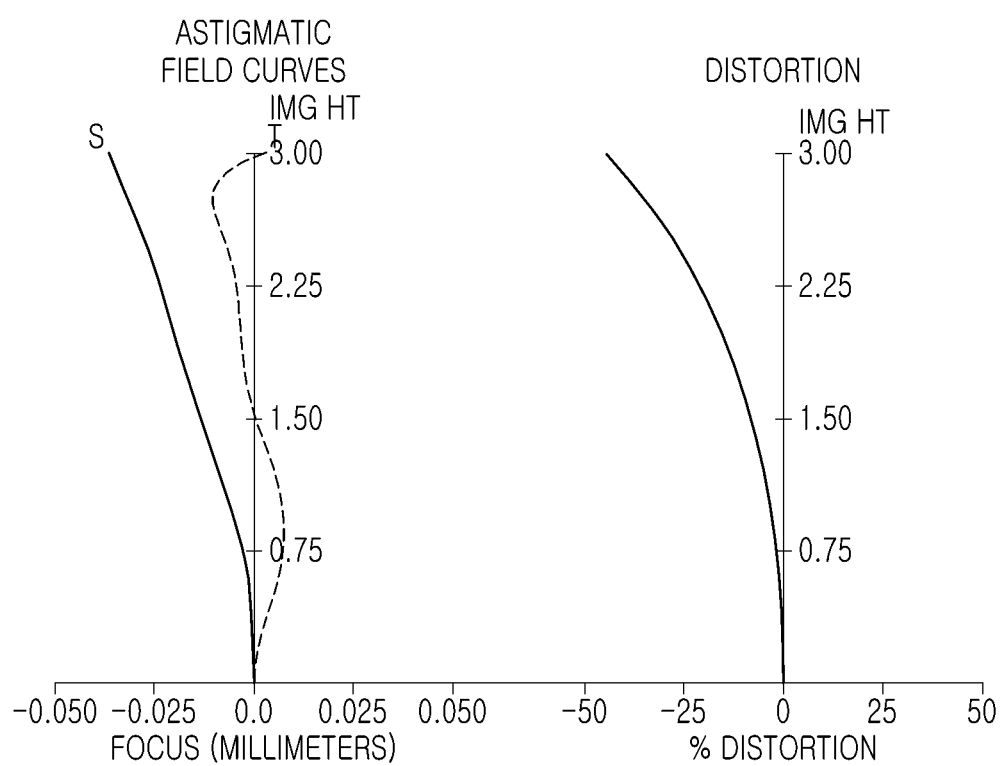
FIG. 22 is a graph illustrating aberrations of the optical imaging system according to the sixth example.
Figure 23:
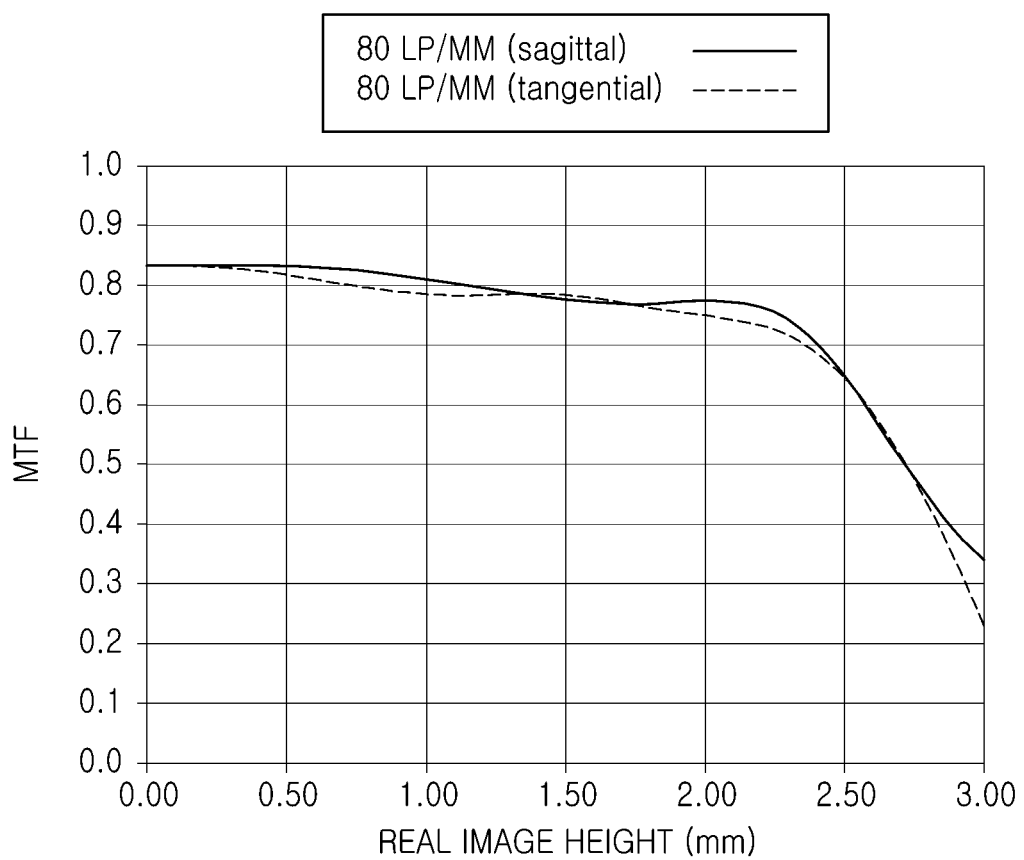
FIG. 23 is a graph illustrating a resolving power according to a field of the optical imaging system according to the sixth example.
Figure 24:
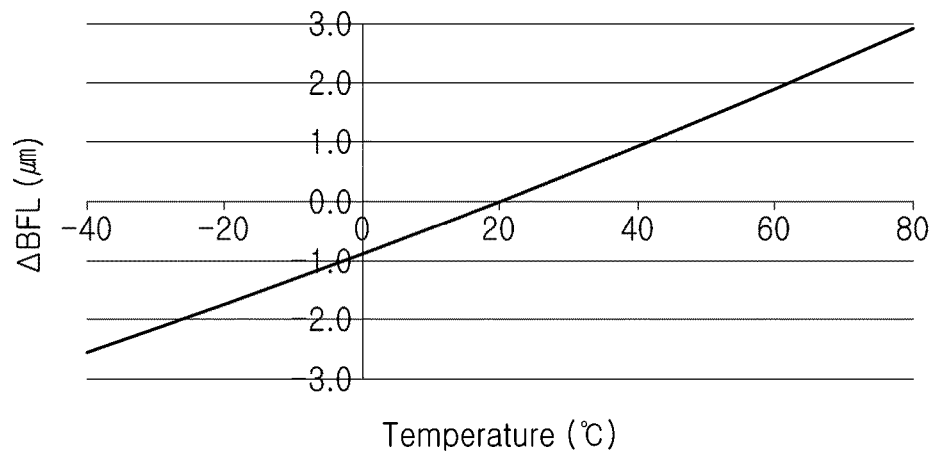
FIG. 24 is a graph illustrating a change in BFL according to temperature in the optical imaging system according to the sixth example.

FIG. 21 illustrates an optical imaging system 600 according to a sixth example. FIG. 22 is a graph illustrating aberrations of the optical imaging system 600. FIG. 23 is a graph illustrating a resolving power according to a field of the optical imaging system 600. FIG. 24 is a graph illustrating a change in BFL according to temperature in the optical imaging system 600.

The optical imaging system 600 includes a first lens 610, a second lens 620, a third lens 630, a fourth lens 640, a fifth lens 650, a sixth lens 660 and a seventh lens 670, and may further include an aperture stop AS, a filter IRCF and an image plane IP. A separate filter F may be additionally disposed on the image plane IP. The filter (F) may be used to protect the image plane IP. In an example, the aperture stop AS is positioned between the second lens 620 and the third lens 630.

In an example, the first lens 610 and the third lens 630 are formed of glass, and the other lenses are formed of plastic.

Table 11 illustrates the characteristics of each lens (radius, thickness or distance between lenses, refractive index, Abbe's number, and focal length). Table 11 further illustrates the refractive index change rate (dn/dT) according to the temperature of each lens, coefficient of thermal expansion (CTE), and vt values.

The third lens 630 has positive refractive power, the object-side surface of the third lens 630 is convex, and the image-side surface of the third lens 630 is convex.

The fourth lens 640 has positive refractive power, the object-side surface of the fourth lens 640 is convex, and the image-side surface of the fourth lens 640 is convex.

The fifth lens 650 has negative refractive power, the object-side surface of the fifth lens 650 is concave, and the image-side surface of the fifth lens 650 is concave.

The sixth lens 660 has positive refractive power, the object-side surface of the sixth lens 660 is convex, and the image-side surface of the sixth lens 660 is convex. The sixth lens 660 may have at least one inflection point on the image-side surface. For example, the object-side surface of the sixth lens 660 may be convex in a paraxial region and concave in a region other than the paraxial region. The image-side surface of the sixth lens 660 may be convex in the paraxial region and concave in a region other than the paraxial region.

The seventh lens 670 has negative refractive power, the object-side surface of the seventh lens 670 is convex, and the image-side surface of the seventh lens 670 is concave. The seventh lens 670 may have at least one inflection point on at least one of an object-side surface and an image-side surface. For example, the object-side surface of the seventh lens 670 may be convex in a paraxial region and concave in a

TABLE 11

| Surface number | Radius of curvature (mm) | Thickness, Distance (mm) | Refractive index (nd) | Abbe's number (Vd) | DTn (10−6/° C.) | CTE (10−6/° C.) | vt (103/° C.) |
|---|---|---|---|---|---|---|---|
| 1 | 20.846 | 0.550 | 1.5286 | 76.97 | −8.1 | 8.0 | −42.9 |
| 2 | 2.273 | 1.794 | | | | | |
| 3 | −2.925 | 0.898 | 1.6612 | 20.35 | −115.0 | 66.0 | −4.2 |
| 4 | −3.675 | 0.301 | | | | | |
| 5(A.S.) | Infinity | −0.201 | — | — | — | — | — |
| 6 | 6.498 | 1.400 | 1.755 | 51.16 | 3.0 | 8.0 | −248.4 |
| 7 | −7.070 | 0.775 | | | | | |
| 8 | 9.569 | 1.347 | 1.5365 | 55.91 | −93.3 | 60.0 | −4.3 |
| 9 | −6.571 | 0.100 | | | | | |
| 10 | −5.764 | 0.545 | 1.6612 | 20.35 | −115.0 | 66.0 | −4.2 |
| 11 | 5.510 | 0.239 | | | | | |
| 12 | 6.036 | 1.362 | 1.5365 | 55.91 | −93.3 | 60.0 | −4.3 |
| 13 | −3.843 | 0.100 | | | | | |
| 14 | 5.404 | 1.034 | 1.5365 | 55.91 | −93.3 | 60.0 | −4.3 |
| 15 | 3.968 | 1.000 | | | | | |
| 16 | Infinity | 0.400 | 1.5168 | 64.17 | 1.6 | 8.0 | −203.9 |
| 17 | Infinity | 0.945 | | | | | |
| 18 | Infinity | 0.400 | 1.5168 | 64.17 | 1.6 | 8 | −203.9 |
| 19 | Infinity | 0.012 | | | | | |
| 20 | Infinity | 0.000 | — | — | — | — | — |

The first lens 610 has negative refractive power, the object-side surface of the first lens 610 is convex, and the image-side surface of the first lens 610 is concave.

The second lens 620 has negative refractive power, the object-side surface of the second lens 620 is concave, and the image-side surface of the second lens 620 is convex.

region other than the paraxial region. The image-side surface of the seventh lens 670 may be concave in the paraxial region and convex in a region other than the paraxial region.

Respective surfaces of the second lens 620 and the fourth lens 640 to the seventh lens 670 have aspheric coefficients as illustrated in Table 12.

TABLE 12

| Surface number | K | A | B | C | D |
|---|---|---|---|---|---|
| 3 | 0.0 | −7.0874E−03 | 1.1440E−03 | −3.2608E−04 | 9.8559E−05 |
| 4 | 0.0 | −2.6111E−03 | −1.7611E−04 | 1.3837E−04 | 1.2207E−05 |
| 6 | 0.0 | 9.1404E−04 | −4.8657E−04 | 1.0734E−04 | 2.1138E−05 |
| 7 | 0.0 | 1.2424E−03 | 5.0070E−04 | −2.2492E−04 | 6.9136E−05 |
| 8 | 0.0 | −3.4123E−03 | 1.5497E−03 | −3.0975E−04 | 2.2305E−05 |
| 9 | 0.0 | −8.0445E−03 | −4.7921E−03 | 1.3450E−03 | −1.0022E−04 |
| 10 | 0.0 | −2.4293E−03 | −6.5399E−03 | 2.0711E−03 | −1.6378E−04 |
| 11 | 0.0 | −8.7266E−03 | 1.0544E−03 | −1.6464E−04 | 6.3399E−05 |
| 12 | 0.0 | −1.9511E−03 | 4.4209E−04 | −1.8086E−04 | 2.0300E−05 |
| 13 | 0.0 | 1.0277E−02 | 8.3244E−05 | 3.6219E−04 | −4.3407E−05 |
| 14 | 0.0 | −2.4274E−02 | 7.9589E−04 | 2.5531E−04 | −2.0696E−05 |
| 15 | 0.0 | −3.4483E−02 | 2.7213E−03 | −1.9209E−04 | 5.2103E−06 |

Referring to FIG. 24, in the optical imaging system 600, the BFL change amount is maintained at a level of 3 μm.

Figure 25:
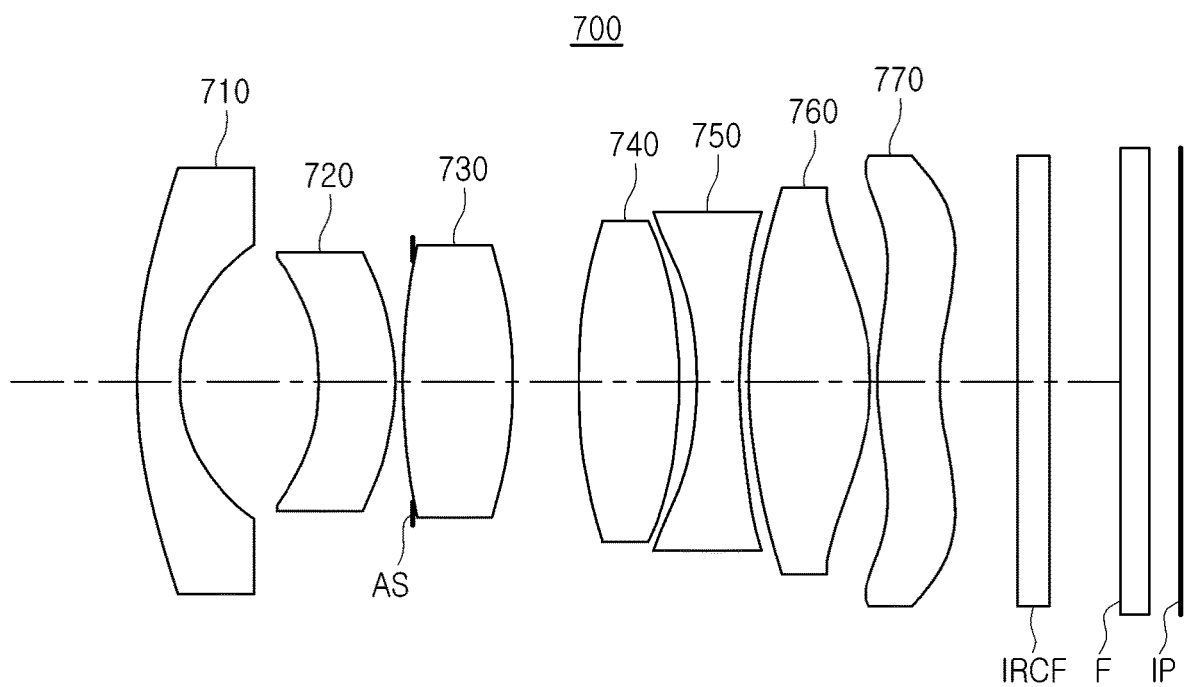
FIG. 25 is a diagram illustrating an optical imaging system according to a seventh example.
Figure 26:
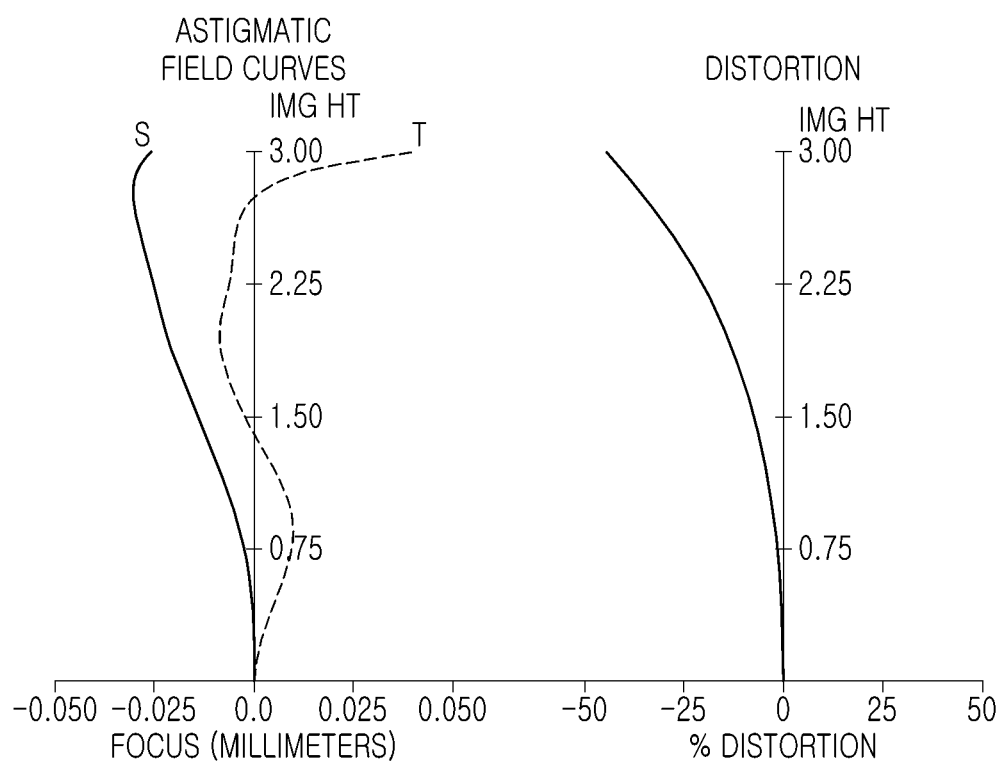
FIG. 26 is a graph illustrating aberrations of the optical imaging system according to the seventh example.
Figure 27:
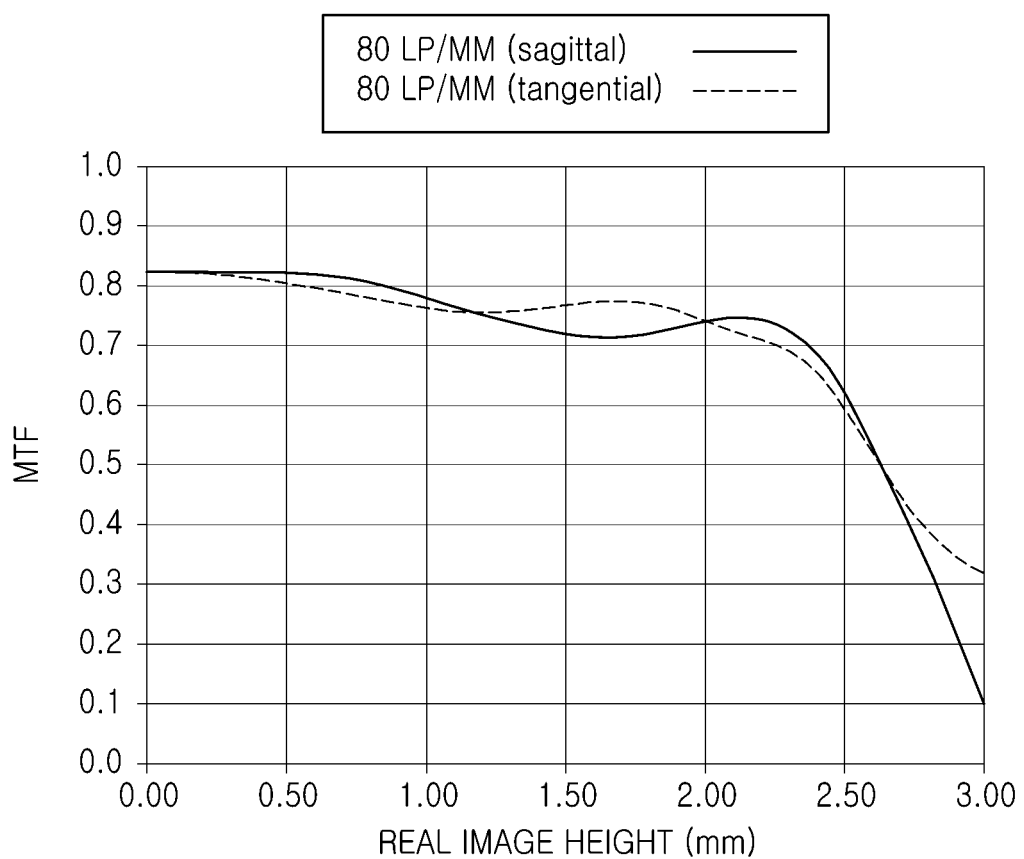
FIG. 27 is a graph illustrating a resolving power according to a field of the optical imaging system according to the seventh example.
Figure 28:
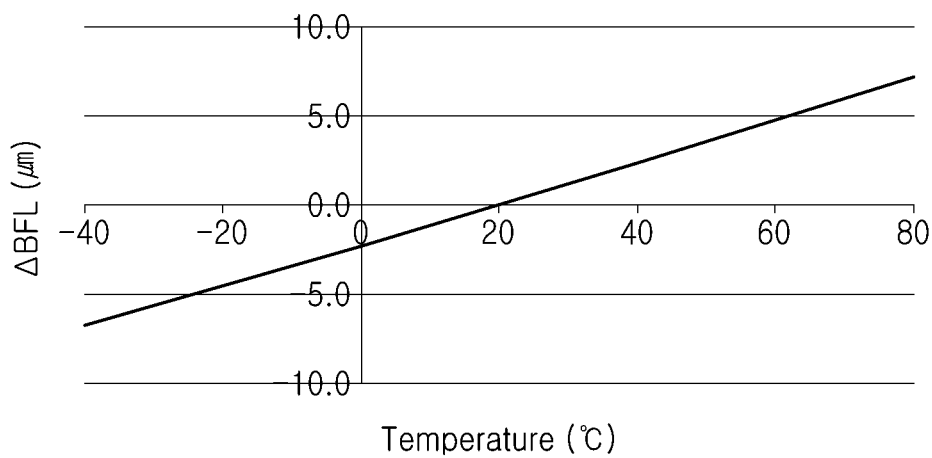
FIG. 28 is a graph illustrating a change in BFL according to temperature in the optical imaging system according to the seventh example.

FIG. 25 illustrates an optical imaging system 700 according to a seventh example. FIG. 26 is a graph illustrating aberrations of the optical imaging system 700. FIG. 27 is a graph illustrating a resolving power according to a field of the optical imaging system 700. FIG. 28 is a graph illustrating a change in BFL according to temperature in the optical imaging system 700.

The optical imaging system 700 includes a first lens 710, a second lens 720, a third lens 730, a fourth lens 740, a fifth lens 750, a sixth lens 760 and a seventh lens 770, and may further include an aperture stop AS, a filter IRCF and an image plane IP. A separate filter F may be additionally disposed on the image plane IP. The filter (F) may be used to protect the image plane IP. In an example, the aperture stop AS is positioned between the second lens 720 and the third lens 730.

In an example, the first lens 710 and the third lens 730 are formed of glass, and the other lenses are formed of plastic.

Table 13 illustrates the characteristics of each lens (radius of curvature, thickness of the lens or distance between lenses, refractive index, Abbe's number, and focal length). Table 13 further illustrates the refractive index change rate (dn/dT) according to the temperature of each lens, coefficient of thermal expansion (CTE), and vt values.

The first lens 710 has negative refractive power, the object-side surface of the first lens 710 is convex, and the image plane IP of the first lens 710 is concave.

The second lens 720 has negative refractive power, the object-side surface of the second lens 720 is concave, and the image-side surface of the second lens 720 is convex.

The third lens 730 has positive refractive power, the object-side surface of the third lens 730 is convex, and the image-side surface of the third lens 730 is convex.

The fourth lens 740 has positive refractive power, the object-side surface of the fourth lens 740 is convex, and the image-side surface of the fourth lens 740 is convex.

The fifth lens 750 has negative refractive power, the object-side surface of the fifth lens 750 is concave, and the image-side surface of the fifth lens 750 is concave.

The sixth lens 760 has positive refractive power, the object-side surface of the sixth lens 760 is convex, and the image-side surface of the sixth lens 760 is convex. The sixth lens 760 may have at least one inflection point on the image-side surface. For example, the object-side surface of the sixth lens 760 may be convex in a paraxial region and concave in a region other than the paraxial region. The image-side surface of the sixth lens 760 may be convex in the paraxial region and concave in a region other than the paraxial region.

TABLE 13

| Surface number | Radius of curvature (mm) | Thickness, Distance (mm) | Refractive index (nd) | Abbe's number (Vd) | DTn ($10^{-6}$/° C.) | CTE ($10^{-6}$/° C.) | vt ($10^3$ ° C.) |
|---|---|---|---|---|---|---|---|
| 1 | 6.098 | 0.550 | 1.592 | 67.02 | −2.0 | 8.0 | −87.9 |
| 2 | 2.064 | 1.787 | | | | | |
| 3 | −2.514 | 0.979 | 1.6612 | 20.35 | −115.0 | 66.0 | −4.2 |
| 4 | −3.350 | 0.228 | | | | | |
| 5(A.S.) | Infinity | −0.128 | — | — | — | — | — |
| 6 | 8.613 | 1.400 | 1.755 | 52.3 | 3.0 | 8.0 | −248.4 |
| 7 | −6.028 | 0.851 | | | | | |
| 8 | 7.760 | 1.289 | 1.5365 | 55.91 | −93.3 | 60.0 | −4.3 |
| 9 | −7.041 | 0.228 | | | | | |
| 10 | −4.861 | 0.539 | 1.6612 | 20.35 | −115.0 | 66.0 | −4.2 |
| 11 | 6.197 | 0.128 | | | | | |
| 12 | 6.833 | 1.553 | 1.5365 | 55.91 | −93.3 | 60.0 | −4.3 |
| 13 | −3.273 | 0.100 | | | | | |
| 14 | 4.207 | 0.797 | 1.5365 | 55.91 | −93.3 | 60.0 | −4.3 |
| 15 | 3.166 | 1.000 | | | | | |
| 16 | Infinity | 0.400 | 1.5168 | 64.17 | 1.6 | 8.0 | −203.9 |
| 17 | Infinity | 0.889 | | | | | |
| 18 | Infinity | 0.400 | 1.5168 | 64.17 | 1.6 | 8 | −203.9 |
| 19 | Infinity | 0.011 | | | | | |
| 20 | Infinity | 0.000 | | | | | |

The seventh lens 770 has negative refractive power, the object-side surface of the seventh lens 770 is convex, and the image-side surface of the seventh lens 770 is concave. The seventh lens 770 may have at least one inflection point on at least one of an object-side surface and an image-side surface. For example, the object-side surface of the seventh lens 770 may be convex in a paraxial region and concave in a region other than the paraxial region. The image-side surface of the seventh lens 770 may be concave in the paraxial region and convex in a region other than the paraxial region.

Respective surfaces of the first lens 710, the second lens 720, and the fourth lens 740 to seventh lens 770 have an aspherical surface coefficient as illustrated in Table 14.

TABLE 14

| Surface number | K | A | B | C | D |
|---|---|---|---|---|---|
| 1 | 0.0 | −2.3483E−03 | 1.8531E−05 | 0.0 | 0.0 |
| 2 | 0.0 | −2.7242E−03 | −4.6246E−04 | 0.0 | 0.0 |
| 3 | 0.0 | 1.5923E−03 | 1.3811E−03 | 0.0 | 0.0 |
| 4 | 0.0 | 2.3964E−03 | 5.2067E−04 | 0.0 | 0.0 |
| 8 | 0.0 | 2.0679E−03 | 1.5744E−04 | 5.2633E−05 | −2.5139E−05 |
| 9 | 0.0 | −5.5756E−03 | −4.8888E−04 | 3.6114E−04 | −3.8940E−05 |
| 10 | 0.0 | −1.2112E−02 | 3.1724E−04 | 6.9229E−04 | −6.3864E−05 |
| 11 | 0.0 | −1.3503E−02 | 3.0251 E−03 | −5.5277E−04 | 6.6208E−05 |
| 12 | 0.0 | −1.0109E−03 | 5.0109E−04 | −1.7585E−04 | 1.4231E−05 |
| 13 | 0.0 | 7.7453E−03 | 1.0580E−03 | 5.5385E−05 | −4.7434E−06 |
| 14 | 0.0 | −3.1178E−02 | 8.1158E−04 | −4.3599E−05 | 1.5809E−05 |
| 15 | 0.0 | −4.0082E−02 | 1.8155E−03 | −7.9485E−05 | −2.3984E−06 |

Referring to FIG. 28, in the optical imaging system 700, the amount of BFL change is maintained at a level of 7 μm.

Table 15 illustrates the values of the conditional expressions of the optical imaging system according to respective examples.

TABLE 15

| Item | Example 1 | Example 2 | Example 3 | Example 4 | Example 5 | Example 6 | Example 7 |
|---|---|---|---|---|---|---|---|
| f[mm] | 3.166 | 3.166 | 3.166 | 3.166 | 3.166 | 3.166 | 3.166 |
| f3 [mm] | 5.435 | 4.447 | 4.653 | 3.71 | 6.563 | 4.693 | 4.898 |
| f/f3 | 0.5825 | 0.7119 | 0.6804 | 0.8532 | 0.4824 | 0.6746 | 0.6463 |
| Pnu[$10^{-6}$° C.$^{-1}$ mm$^{-1}$] | −8.4 | −9.5 | −10.7 | −17.7 | 20.7 | −8.7 | −10.5 |
| Pnu3/Pnu | 0.088 | 0.079 | 0.059 | 0.053 | −0.03 | 0.098 | 0.079 |
| Σ1/(DTni · fi) [$10^{4}$° C. mm$^{-1}$] | 8.361 | 9.003 | 8.158 | −1.368 | 5.120 | 9.516 | 15.693 |
| DTnF/DTnR | 0.314 | 0.315 | 0.311 | 0.285 | 0.532 | 0.314 | 0.299 |
| f/IMGHT | 1.055 | 1.055 | 1.055 | 1.055 | 1.055 | 1.055 | 1.055 |
| DTnT[$10^{-6}$° C.$^{-1}$] | −515 | −514.4 | −518.3 | −502.7 | −600.2 | −515 | −508.9 |
| DTnF[$10^{-6}$° C.$^{-1}$] | −123.1 | −123.1 | −123.1 | −111.4 | −208.3 | −123.1 | −117 |
| DTnR[$10^{-6}$° C.$^{-1}$] | −391.9 | −391.3 | −395.2 | −391.3 | −391.9 | −391.9 | −391.9 |

As set forth above, an optical imaging system according to various examples may provide relatively high quality resolution even in a wide temperature range. In addition, the optical imaging system may be configured such that the BFL change is significantly small even in a wide temperature range, and accordingly, the focal length may be maintained at a certain level.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens, a third lens, a fourth lens, a fifth lens, a sixth lens, and a seventh lens sequentially disposed from an object side; and
an aperture stop disposed between the second lens and the third lens,
wherein $|Pnu|[10^{-6\circ} C.^{-1} mm^{-1}] \leq 30$, where Pnu is $\Sigma Pnui$ in which i=1, 2, ..., 7, Pnui is $1/(vti \cdot fi)$, vti is $[DTni/(ni-1)-CTEi]^{-1}$, fi is an effective focal length of an i-th lens, ni is a refractive index of the i-th lens, DTni is a rate (dni/dT) of change of the refractive index according to a temperature of the i-th lens, and CTEi is a thermal expansion coefficient of the i-th lens.

2. The optical imaging system of claim 1, wherein $0.4 \leq f/f3$, where f is an effective focal length of the optical imaging system, and f3 is an effective focal length of the third lens.

3. The optical imaging system of claim 1, wherein $|Pnu3/Pnu|<0.2$.

4. The optical imaging system of claim 1, wherein the third lens is comprised of glass, and the second lens, the fourth lens, the fifth lens, the sixth lens, and the seventh lens are comprised of plastic.

5. The optical imaging system of claim 1, wherein $-2.0<\Sigma 1/(DTni \cdot fi) [10^{4\circ} C. mm^{-1}]<20.0$, where i=1, 2, ..., 7.

6. The optical imaging system of claim 1, wherein $0.2<DTnF/DTnR<0.6$, where DTnF is a sum of DTn values of the first lens and the second lens, in which $\Sigma DTni$ (i=1, 2), and DTnR is a sum of DTn values of the third to seventh lenses, in which $\Sigma DTni$ (i=3, 4, ..., 7).

7. The optical imaging system of claim 1, wherein $-620<DTnT [10^{-6\circ} C.^{-1}]<-450$, where DTnT is a sum of DTn values of the first to seventh lenses, in which $\Sigma DTni$ (i=1, 2, ..., 7).

8. The optical imaging system of claim 1, wherein $-220<DTnF [10^{-6\circ} C.^{-1}]<-100$, where DTnF is a sum of DTn values of the first lens and the second lens, in which $\Sigma DTni$ (i=1, 2).

9. The optical imaging system of claim 1, wherein $-400<DTnR [10^{-6\circ} C.^{-1}]<-300$, where DTnR is a sum of DTn values of the third to seventh lenses, in which $\Sigma DTni$ (i=3, 4, ..., 7).

10. The optical imaging system of claim 1, wherein an object-side surface of the seventh lens is convex and an image-side surface of the seventh lens is concave.

11. The optical imaging system of claim 1, wherein the first lens has a negative refractive power, the third lens has a positive refractive power, the fourth lens has a positive refractive power, the fifth lens has a negative refractive power, and the sixth lens has a positive refractive power.

12. An optical imaging system comprising:
a first lens, a second lens, a third lens, a fourth lens, a fifth lens, a sixth lens, and a seventh lens sequentially disposed from an object side,
wherein an object-side surface of the seventh lens is convex and an image-side surface of the seventh lens is concave, and
wherein $|Pnu|[10^{-6\circ} C.^{-1} mm^{-1}]30$, where Pnu is $\Sigma Pnui$ in which i=1, 2, ..., 7, Pnui is $1/(vti \cdot fi)$, vti is $[DTni/(ni-1)-CTEi]^{-1}$, fi is an effective focal length of an i-th lens, ni is a refractive index of the i-th lens, DTni is a rate (dni/dT) of change of the refractive index according to a temperature of the i-th lens, and CTEi is a thermal expansion coefficient of the i-th lens.

13. An optical imaging system comprising:
a first lens having negative refractive power, a second lens, a third lens having positive refractive power, a fourth lens having positive refractive power, a fifth lens having negative refractive power, a sixth lens having positive refractive power, and a seventh lens sequentially disposed from an object side,
wherein $|Pnu|[10^{-6\circ} C.^{-1} mm^{-1}] \leq 30$, where Pnu is $\Sigma Pnui$ in which i=1, 2, ..., 7, Pnui is $1/(vti \cdot fi)$, vti is $[DTni/(ni-1)-CTEi]^{-1}$, fi is an effective focal length of an i-th lens, ni is a refractive index of the i-th lens, DTni is a rate (dni/dT) of change of the refractive index according to a temperature of the i-th lens, and CTEi is a thermal expansion coefficient of the i-th lens.

* * * * *